(12) United States Patent
Yasohara et al.

(10) Patent No.: US 6,812,667 B2
(45) Date of Patent: Nov. 2, 2004

(54) MOTOR DRIVER

(75) Inventors: Masahiro Yasohara, Hyogo (JP); Kenji Sugiura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 26 days.

(21) Appl. No.: 10/373,342

(22) Filed: Feb. 24, 2003

(65) Prior Publication Data

US 2004/0007998 A1 Jan. 15, 2004

(30) Foreign Application Priority Data

Jul. 15, 2002 (JP) .................................... 2002-205227

(51) Int. Cl.[7] .................................................. G05B 11/28
(52) U.S. Cl. ...................... 318/599; 318/138; 318/439; 318/254
(58) Field of Search .............................. 318/254, 138, 318/439, 599, 432

(56) References Cited

U.S. PATENT DOCUMENTS

| | | | | |
|---|---|---|---|---|
| 5,594,322 A | * | 1/1997 | Rozman et al. | 322/10 |
| 5,631,999 A | * | 5/1997 | Dinsmore | 388/805 |
| 5,783,917 A | * | 7/1998 | Takekawa | 318/439 |
| 6,307,336 B1 | * | 10/2001 | Goff et al. | 318/254 |
| 2002/0185986 A1 | * | 12/2002 | Seki | 318/599 |

FOREIGN PATENT DOCUMENTS

| | | | |
|---|---|---|---|
| JP | 01-126191 | 5/1989 | |
| JP | 06-233583 | 8/1994 | |
| JP | 06-233584 | 8/1994 | |
| JP | 06-233585 | 8/1994 | |
| WO | WO 02/052713 A2 | * 7/2002 | ............. H02P/6/10 |

OTHER PUBLICATIONS

International Search Report for PCT/JP03/02135 dated Jul. 16, 2003.

* cited by examiner

*Primary Examiner*—Rita Leykin
(74) *Attorney, Agent, or Firm*—RatnerPrestia

(57) ABSTRACT

In a motor driver, based on driving waveforms of respective phases generated by a driving waveform generator, a power feeder feeds respective phase-coils with an alternating current consecutively changing in sine wave. Further, a phase advancing controller adjusts phases of the driving waveform, and performs phase-advancing control such that each phase of back electromotive forces induced in respective phase-coils generally coincides with a phase of the ac running through the coils. In phase-advancing controlling, a phase current is detected with a common current. The structure discussed above can reduce torque ripples, vibrations and noises, and a motor thus can be driven efficiently.

36 Claims, 18 Drawing Sheets

ABSTRACT

MOTOR DRIVER

TECHNICAL FIELD

The present invention relates to a motor driver suitable for driving a brush-less dc motor used in an air conditioner, a water heater equipped with a combustion fan motor, an air cleaner, and information apparatuses such as a copying machine and a printer. More particularly, it relates to a motor driver that feeds motor driving coils with an alternating current consecutively varying, more preferably an approx. sine-wave current. The flow of the ac makes a phase difference generally zero between a phase of the back electromotive forces induced in those coils and a phase of the ac running through those coils. As a result, a motor of lower torque ripples, fewer vibrations, and lower noises is obtainable.

BACKGROUND ART

DC brushless motors have been widely used as driving motors built in, e.g., an air conditioner and an information apparatus including a copying machine, a printer and the like because of the advantages of the motors such as a long service-life, high reliability, and easiness of speed control.

FIG. 17 is a circuit diagram of a conventional motor driver. FIG. 18 shows waveforms at respective sections of the motor driver with respect to a rotating angle (electrical angle) of the motor.

As shown in FIG. 17, a driver of a brushless DC motor (hereinafter simply referred to as a motor), in general, detects a rotor position with a plurality of position detectors 901, 903 and 905 comprising a Hall effect device. Three-phase distributor 890 receives position signals Hu, Hv and Hw, and outputs three-phase distribution signals UH0, UL0, VH0, VL0, WH0, and WL0 to pulse-width modulator (PWM modulator) 840, where those signals are modulated into signals having a pulse width responsive to signal S set by speed setter 860. Modulator 840 outputs signals which control, via gate driver 830, six switches 821–826 forming power-feeder 820 to be sequentially turned ON or OFF. The power supplied to three-phase coils 811, 813 and 815 is thus switched in sequence responsive to a rotor position like signals U, V and W as shown in FIG. 18, so that the motor is spun.

A voltage—applied between a coil end of each one of respective phase coils and neutral point N—shapes in a rectangular waveform, thus changing a current in the respective phase coils causes sharp ON-OFF switches responsive to the rectangular waveform signals. As a result, coils are vibrated, thus mechanical noises and electrical noises are produced. The switching frequency of the respective phases generates torque ripples, which vibrate the apparatus employing the motor, and the vibrations resonate the apparatus, so that noises are produced.

A motor driver, driving the motor-driving-coils of respective phases with a driving waveform in a sine-wave, is well known to lower the foregoing noises and electrical noises. This kind of motors are disclosed in Japanese Patent Application Non-Examined Publication No. H06-233583, H06-233584, H06-233585, and Japanese Patent No. 2658085. Those motor drivers disclosed in the foregoing publications use a detected output from a detecting element which detects major magnetic-field for driving, and an address signal formed of the output of the detecting element, whereby a driving waveform stored in a memory is read out for driving the motor.

In the conventional motor driver discussed above, however, the driving waveform with respect to a rotational position of the rotor, namely, a voltage waveform applied to the coils of respective phases, is uniquely determined by digital-signal data stored in the memory discussed above. Thus, in the case where the driver drives a motor having a rather large inductance, e.g., a stator iron core is wounded with coils, a phase delay of current of respective phases with respect to the voltages applied to the respective phases becomes larger when the driving waveform is applied to the respective phases. Such a delay in the respective phase currents enlarges a phase difference between the back electromotive force (BEMF) induced in the respective phases and the phase current. As a result, the torque of the motor is reduced, namely, efficiency of the motor is lowered.

In general, the torque of motors is approx. proportionate to cos. $\phi$, where $\phi$ is a phase difference between the BEMF induced in respective phases and the phase current. In other words, when the phase difference between the phase current and the BEMF becomes zero ($\phi=0$), the torque of the motor can be optimally supplied. However, an inductance component of driving coils positively generates a phase delay in the phase current, so that the foregoing phase difference is produced. This phase delay is taken into consideration in advance, so that the mounting position of a position detector for the rotor is mechanically shifted such that each voltage applied to respective phases is advanced. This method is conceivable; however, an amount of the phase delay in current is not constant but varies depending on a load or an rpm. Thus this method is able to produce an optimized efficiency only at a specific load.

As discussed above, the phase delay of phase current varies depending on the condition of a motor in use such as a load or an rpm, or the properties of the motor per se such as a BEMF, an inductance, and electrical time constant. Therefore, the foregoing phase difference cannot always stay at zero for driving the motor at the optimum efficiency.

The conventional motor driver discussed above, however, requires a memory storing a predetermined driving waveform and a digital-analog (D/A) converter which reads out the driving waveform (digital signal) before converting the digital signal into an analog signal for driving the motor. The conventional motor driver is thus equipped with a complicated circuit.

DISCLOSURE OF INVENTION

The present invention addresses the problems discussed above and aims to provide a motor driver that can drive a motor at an optimal efficiency in any conditions with lower torque ripples, fewer vibrations, and lower noises. This motor driver is simply structured, where the driving coils of the respective phases are fed with an ac in approx. sine-waveform, and the phase difference between the ac and the back electromotive force (BEMF) induced in those coils is kept always at nearly zero.

The motor driver comprises the following elements:
(a) driving coils for three phases;
(b) a dc power supply disposed between a first feeder line and a second feeder line;
(c) a driving wave generator for generating driving waves at intervals of one cycle in electrical angles corresponding to respective phase-coils;
(d) a phase advancing controller for controlling a phase of a driving waveform; and
(e) a power feeder for driving respective coils with an alternating current consecutively changing, by coupling the respective coils to a first feeder line or a second feeder line based on a modulated signal produced by modulating a pulse width of the driving waveform.

To be more specific about some elements discussed above, the power feeder can achieve at least the following two coupling statuses:

a first coupling status: a second phase is coupled to the first feeder line, and a first and a third phases are coupled to the second feeder line, and a second coupling status: the first and the second phases are coupled to the first feeder line, and the third phase is coupled to the second feeder line.

The phase advancing controller compares a value of common current running through the first or the second feeder line in the first coupling status with that of the second coupling status, and controls a phase of the driving waveform such that the common current values of the respective coupling statuses become approx. the same in the vicinity of the zero-cross of the BEMF induced in the first phase coil. This phase control of the driving waveform by the phase advancing controller allows the phases of BEMFs of the respective phase coils to be approx. matched with the phases of the ac running through those coils.

The structure discussed above allows the motor driver of the present invention to drive a motor efficiently with less torque ripples, fewer vibrations and lower noises.

The apparatuses of the present invention employ this motor driver in their fan motors.

The apparatuses of the present invention employ this motor driver in their driving systems.

Since those apparatuses of the present invention employ this motor driver, the apparatuses work efficiently with fewer vibrations and lower noises.

DETAILED DESCRIPTION OF THE PREFERRED EMBODIMENTS OF THE INVENTION

Exemplary embodiments of the present invention are demonstrated hereinafter with reference to the accompanying drawings.

Exemplary Embodiment 1

Figure 1:
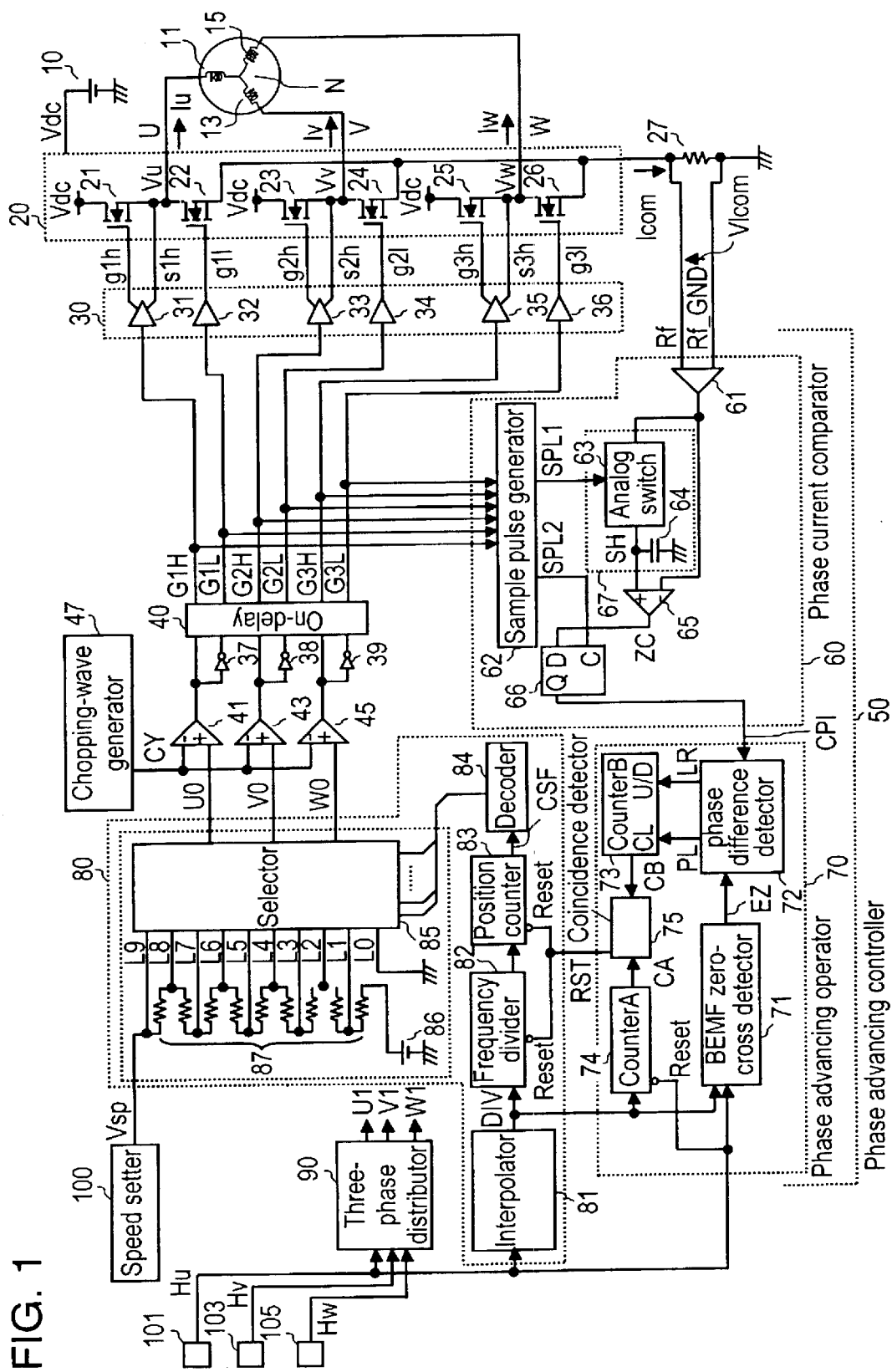
FIG. 1 shows a circuit diagram of a motor driver in accordance with a first exemplary embodiment of the present invention.

In FIG. 1, driving coils 11, 13 and 15 of the three phases (U, V, W) are coupled to power feeder 20 in the following way: Power feeder 20 forms an upper arm using field effect transistors (FETs) 21, 23 and 25, and forms a lower arm using FETs 22, 24 and 26. A first terminal of coil 11 of phase U is coupled to a junction of FET 21 and FET 22, a first terminal of coil 13 of phase V is coupled to a junction of FET 23 and FET 24, and a first terminal of coil 15 of phase W is coupled to a junction of FET 25 and FET 26. Second terminals of coils 11, 13 and 15 of phase U, V and W are coupled to each other, thereby forming neutral point N.

Direct-current power supply 10 connects its positive feeder terminal to power feeder 20, thereby powering the three-phase coils via power feeder 20. On a line between the negative feeder terminal of power supply 10 and power feeder 20, common-current detecting resistor 27 is placed for detecting common-current "Icom" running through the line.

The line directly coupled to the positive feeder terminal of DC power supply 10 is referred to as a first feeder line, and the line directly coupled to the negative feeder terminal of DC power supply 10 is referred to as a second feeder line. In other words, DC power supply is coupled between the first and the second feeder lines.

Position detectors 101, 103 and 105 comprises a Hall element or a Hall IC, and detect positions of the mover with respect to respective phase coils 11, 13 and 15. (The mover is not shown in the drawings. "Mover" is a generic term, and the mover of a rotational motor is referred to as a rotor while that of a linear motor is referred to as a mover. Hereinafter the mover is referred to as a rotor.) Position detectors 101, 103 and 105 supply position detection signals Hu, Hv and Hw, and signal Hu is supplied to driving waveform generator 80. Generator 80 generates driving waveform signals U0, V0 and W0 having phase difference of 120 degrees from each other in electrical angles at intervals of one cycle of signal Hu in electrical angles responsive to respective phase driving coils 11, 13 and 15.

Driving waveform generator 80 comprises interpolator 81, frequency divider 82, position counter 83, decoder 84, selector 85, DC power supply 86, and series resistors 87. Foregoing position detection signal Hu of phase U is fed into interpolator 81. Interpolator 81 splits one cycle in electrical angles of signal Hu into smaller units (e.g., into 144 units), and outputs split signal DIV, which is frequency-divided by divider 82 (e.g., divided into quarters), then supplied to position counter 83 (e.g., counting in 36-numaration system). Counter 83 counts signal DIV, thereby producing a finer rotor-position detection signal, which is supplied to decoder 84 as address signal CSF. Selector 85 comprises an analog switch, and selects any ones of voltage levels L0–L9 set by series resistor 87 for outputting driving-waveform signals U0, V0 and W0 respectively. Voltage levels L0–L9 are selected by output signals from decoder 84. Decoder 84 outputs driving waveform signals of respective phases, and the output signal is generated corresponding to respective address signals of signal CSF.

Figure 2:
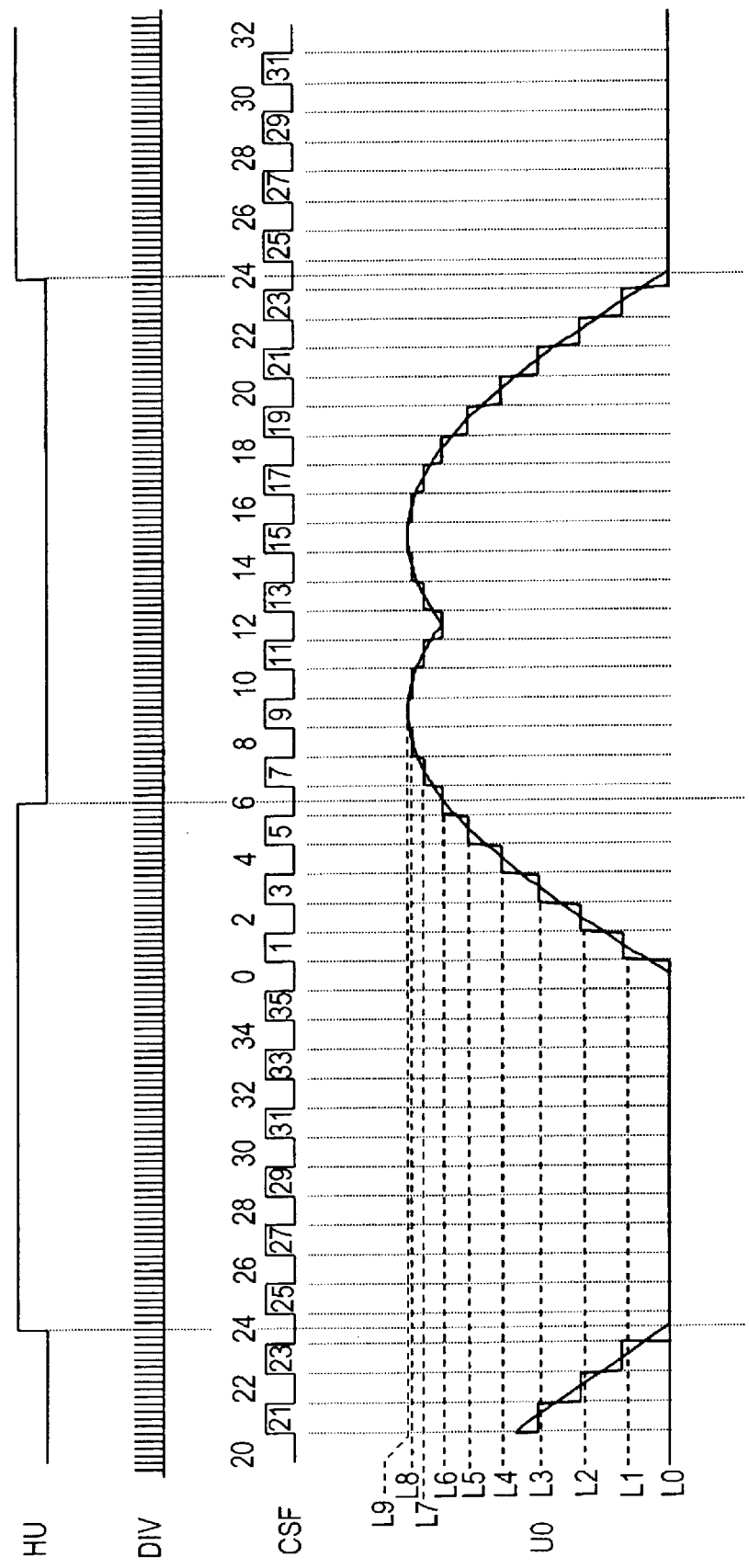
FIG. 2 illustrates how a waveform is generated by a driving waveform generator.
Figure 4:
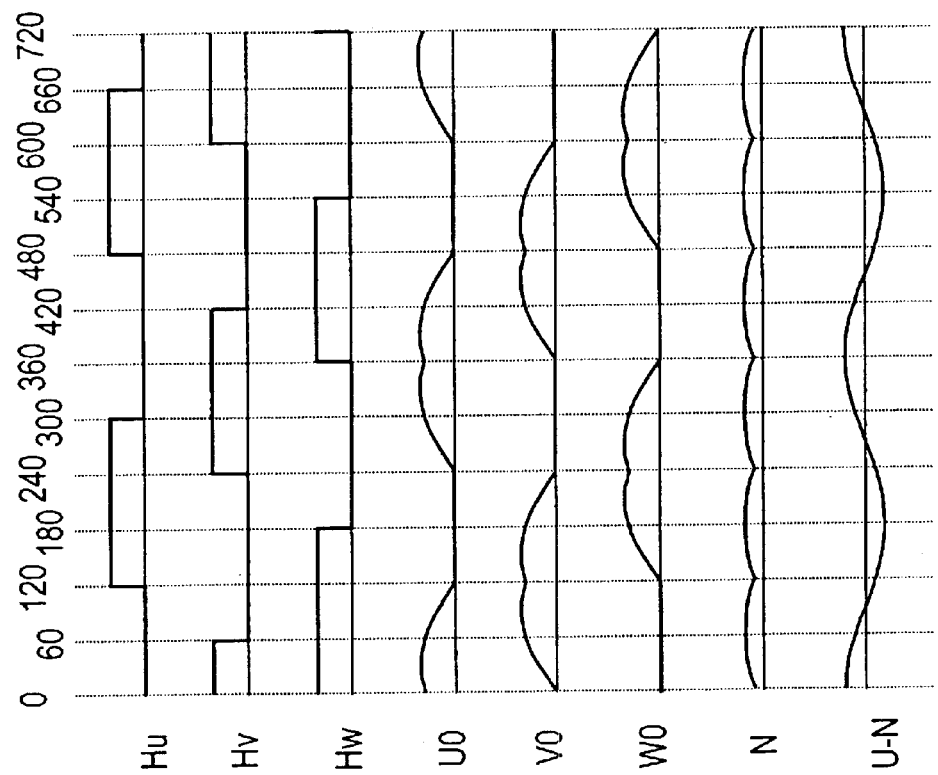
FIG. 4 show driving waveform signals when the motor is in regular operation.

Driving waveform generator 80 generates driving waveform signals U0, V0 and W0. Among those signals, FIG. 2 shows how signal U0 is generated. As shown in FIG. 2, signal U0 is a step-like waveform having voltage levels L0–L9. Signals V0 and W0 take similar shapes. Signals U0, V0 and W0 have phase differences of 120 degrees in electrical angles from each other as shown in FIG. 4. The peak values (wave heights) of those signals are determined by output signal Vsp from speed setter 100.

Figure 3A:
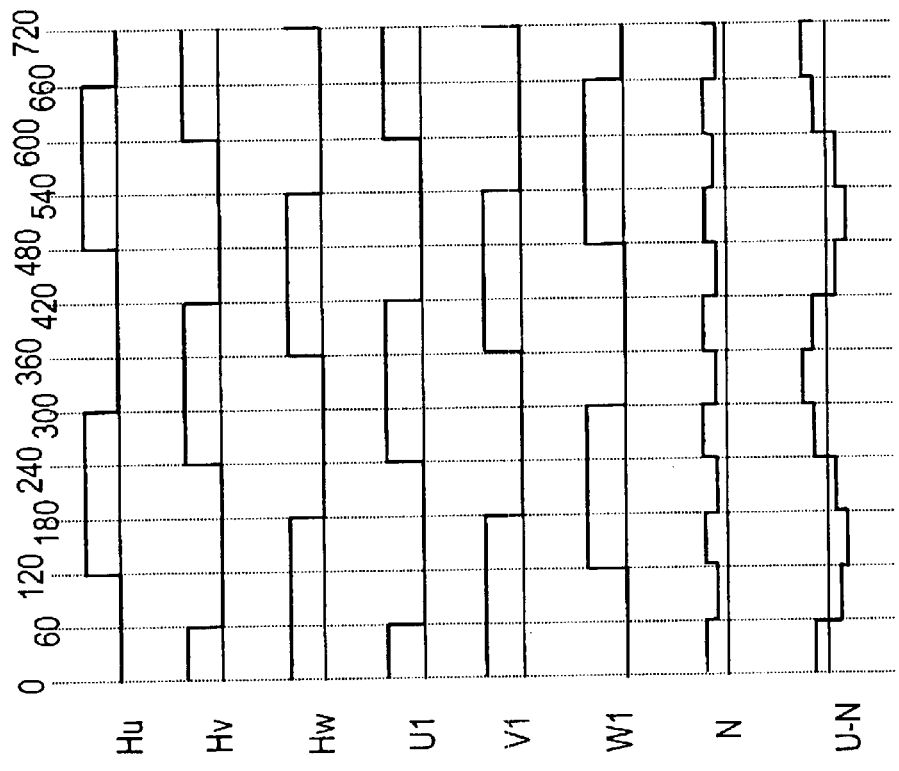
FIGS. 3A, 3B show driving waveform signals when the motor starts being driven.
Figure 3B:
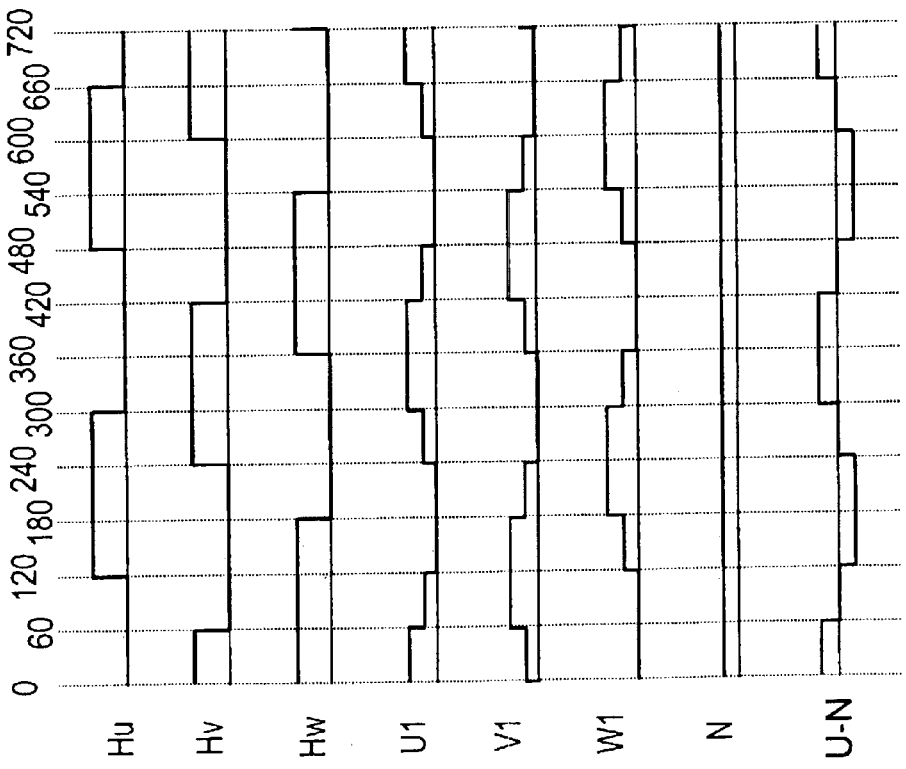

On the other hand, three-phase distributor 90 receives position detection signals Hu, Hv and Hw having 120 degrees phase difference in electrical angles from each other, and outputs three-phase distribution signals U1, V1 and W1 as shown in FIG. 3A or 3B. Although a detailed structure is not shown, at starting a motor, three-phase distribution signals U1, V1 and W1 are used as driving waveform signals until the operation of the signals split by interpolator 81 settles down. After the motor is started, the motor is driven by the driving waveform signals U0, V0 and W0.

Signals U0, V0 and W0 are supplied to comparators 41, 43 and 45 respectively, where those signals are compared with chopping-wave signal CY supplied from chopping-wave generator 47. Chopping-wave signal CY is a so-called carrier signal in terms of pulse width modulating (PWM), and its frequency ranges from several kHz to several hundreds kHz, which is rather higher than the frequencies of signals U0, V0 and W0.

On-delay circuit-block 40 (hereinafter referred to simply as on-delay 40) is disposed in order to prevent the simultaneous conduction at PWM between the upper arm transistors 21, 23, 25 and the lower arm transistors 22, 24, 26, where the upper and lower arms form power feeder 20. Gate driver 30 comprises buffers 31, 32, 33, 34, 35 and 36.

An output signal supplied from comparator 41 is fed into buffer 31 as signal G1H via on-delay 40, and at the same time, inverted by inverter 37 before supplied to buffer 32 as signal G1L via on-delay 40. An output signal supplied from comparator 43 is fed into buffer 33 as signal G2H via on-delay 40, and at the same time, inverted by inverter 38 before supplied to buffer 34 as signal G2L via on-delay 40. In the same manner, an output signal from comparator 45 is fed into buffer 35 as signal G3H via on-delay 40, and at the same time, inverted by inverter 39 before supplied to buffer 36 as signal G3L via on-delay 40. Respective outputs from buffer 31, 32, 33, 34, 35 and 36 are fed into respective gates of transistors 21, 22, 23, 24, 25 and 26.

Common-current "Icom" running through resistor 27 is detected as a terminal-to-terminal voltage across resistor 27, and this detected voltage "VIcom" is fed into phase-advancing controller 50, which comprises phase current comparator 60 and phase advancing operator 70.

Phase current comparator 60 receives detected voltage VIcom, and output signals G1H, G1L, G2H, G2L, G3H, G3L, and supplies signal CPI to phase advancing operator 70. Phase advancing operator 70 receives signal CPI, position detection signal Hu, and output signal DIV from interpolator 81, and supplies signal RST to frequency divider 82 as well as to a reset input-terminal of position counter 83, where divider 82 and counter 83 are included in driving waveform generator 80.

An operation of the motor driver discussed above is described hereinafter, and firstly a fundamental operation is described with reference to FIG. 2–FIG. 5.

FIG. 3A shows signal waveforms at respective sections of FIG. 1 with respect to a motor rotating angle (electric angle) when the motor is started. Position detectors 101, 103 and 105 are disposed such that position detection signals Hu, Hv and Hw have a phase difference of 120 degrees in electrical angles from each other. Signals Hu, Hv and Hw are synthesized by three-phase distributor 90 and formed into three-phase distributed signals U1, V1, W1 respectively as shown in FIG. 3A. In starting a motor, driving signals of respective phases corresponding to three-phase distributed signals U1, V1 and W1 are PWM modulated, and applied to power feeder 20. At this time, a voltage at a neutral point of the three-phase coils becomes "N" shown in FIG. 3A, and a voltage across a first terminal of the phase U coil and a second terminal thereof, i.e., neutral point N, draws the waveform U-N shown in FIG. 3A. In the same manner, although this is not shown in the drawings, similar waveforms having 120 degrees (electrical angle) phase-difference are drawn for phase V and phase W.

Position detection signals Hu, Hv and Hw are just waveform-shaped into three-phase distributed signals U1, V1 and W1 as shown in FIG. 3B, and those signals can be used for the driving waveform in starting a motor. In this case, the circuit can be simplified, and voltage U-N between terminals of the phase coils becomes more like sine-waveform than that shown in FIG. 3A, so that noises in starting the motor can be reduced.

FIG. 4 shows signal-waveforms of respective sections in the motor driver with respect to a rotational angle (in electrical angles) of the motor at a regular spin. If the rotational angles shown in X-axis are expressed in electrical angles, signal Hu, Hv, Hw would draw the similar waveforms to what is shown in FIG. 3A or 3B. Signal Hu is supplied to driving waveform generator 80 to form driving waveform signals U0, V0, W0 drawing the voltage waveform for three phases as shown in FIG. 4. Strictly speaking, signals U0, V0 and W0 draw step-like waveforms as shown in FIG. 2. During the regular spin of the motor, respective phase-driving signals corresponding to signals U0, V0, W0 are applied to power feeder 20. At this time, the voltage at the neutral point of the three-phase coils draws a curve "N" shown in FIG. 4. The voltage applied between a first terminal of phase U coil 11 and a second terminal, i.e., neutral point N draws a curve "U-N" like a sine-wave shown in FIG. 4. In each of phases V and W, the voltage draws similar curves like sine-waves (not shown) having 120 degree phase-difference. As such, respective alternating currents, consecutively changing and shaping in sine waves, run through three-phase coils, thereby driving the coils.

Increase or decrease of signals Vsp supplied from speed setter 100 can change a speed of the motor. In other words, increase or decrease of signals Vsp can vary the peak values (height of the waves) of driving waveform signals U0, V0, W0. As a result, an amount of power to be fed to respective coils can be changed, thus the motor speed can be varied.

Figure 5:
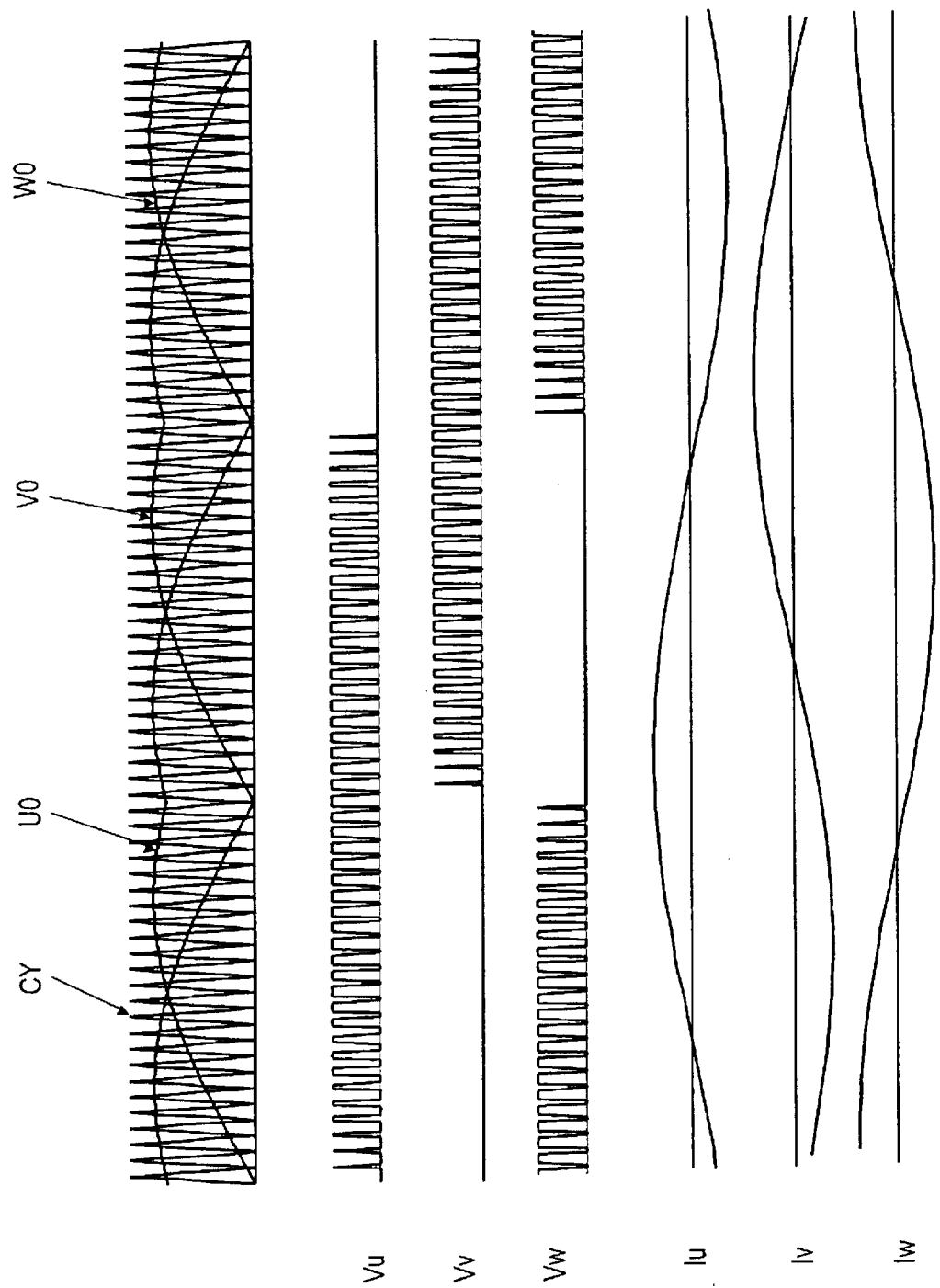
FIG. 5 illustrates how a driving waveform signal is pulse-width modulated (PWM).

FIG. 5 illustrates how the voltages—applied to the respective three-phase coils—undergo a pulse-width modification (PWM). In FIG. 5, comparators 41, 43, 45 compare, in voltages, carrier signal CY produced by chopping-wave oscillator 47 with driving waveform signals U0, V0, W0 of respective phases produced by driving-waveform generator 80. PWM voltage-waveforms of Vu, Vv, Vw as shown in FIG. 5 are applied to output terminals Vu, Vv, Vw, i.e., the respective first terminals of the three-phase coils, via on-delay 40, gate driver 30 and power feeder 20. In actual, the foregoing PWM voltage waveforms are applied to respective phase-coils; however, in average, the waveforms similar to the waveforms of driving waveform signals U0, V0, W0 are applied, so that the three-phase coils are driven by the ac of sine-wave having 120 degrees phase difference from each other, i.e., driven by phase currents Iu, Iv, Iw.

As discussed above, respective phase currents running through the three-phase coils can be thus switched smoothly, and three-phase torque synthesized can be uniformed regardless of a rotating angle. As a result, a motor driver generating smaller torque ripple, fewer vibrations and lower noises is obtainable.

The driving waveform signals U0, V0, W0 for obtaining an ac of sine-wave can be generated by a simple structure, where selector 85 selects a voltage level from levels L0–L9 set by series resistors 87 disposed in driving waveform generator 80 shown in FIG. 1. It does not need memories such as a ROM, or a D/A converter. Therefore, the driver can be obtained at an inexpensive cost.

On the other hand, phase advancing controller 50 receives detection voltage "VIcom" of common current "Icom" running through common-current detecting resistor 27. Based on the information included in voltage VIcom, phase current comparator 60 disposed in controller 50 compares two phase currents with each other running through the two coils out of three-phase coils, and supplies the resulting signal CPI to phase advancing operator 70. Operator 70 adjusts the phases of driving waveform signals U0, V0, W0 responsive to a value of signal CPI at the zero-cross timing of back electromotive force (BEMF) induced in the phase coils. This phase adjustment is called as the phase advancing control.

This phase advancing control makes a phase of BEMF of respective phase coils coincide with a phase of the phase current running though the respective coils, so that the motor can be driven always at an optimal efficiency in any circumstances.

The fundamental circuit, its operation and the advantages of the first exemplary embodiment are hereinbefore described. Next, phase advancing controller 50 is detailed in structure and operation.

As shown in FIG. 1, phase advancing controller 50 comprises phase current comparator 60 and phase advancing operator 70. Phase current comparator 60 includes structural elements 61–67. In comparator 60, differential amplifier 61 amplifies detected voltage "VIcom" to a voltage appropriate for a succeeding circuit to process signals with ease. Meanwhile, voltage "VIcom" is produced by common current "Icom" running through a feeder line on a negative side of dc power supply 10. An output from differential amplifier 61 is supplied to a first input terminal of comparator 65, and also, to a second input terminal via sample & hold circuit 67 formed of analog switch 63 and capacitor 64. Sample & hold circuit 67 samples voltages supplied from amplifier 61 and holds them in capacitor 64 with pulse signal SPL1 supplied from sample pulse generator 62. Generator 62 outputs signal SPL1 when output signals G1H, G1L, G2H, G2L, G3H, G3L from on-delay 40 become a given status described later. When output signals G1H, G1L, G2H, G2L, G3H, G3L become another given status than the forgoing given one, generator 62 outputs pulse signal SPL2, which is supplied to clock input terminal (C) of D-type flip-flop 66. An output from comparator 65 is supplied to data input terminal (D) of flip-flop 66, and an output of D-type flip-flop 66 is supplied to phase advancing operator 70 as output signal CPI supplied from phase current comparator 60.

Phase advancing operator 70 comprises structural elements 71–75. In phase advancing operator 70, signal CPI is supplied to a first input terminal of phase difference detector 72. BEMF zero-cross detector 71 receives position detection signal Hu and output signal DIV from interpolator 81, and those signals output zero-cross timing pulse signals EZ of BEMFs of respective phase coils. Signal EZ is supplied to a second input terminal of phase difference detector 72. Detector 72 outputs signal LR that determines whether a phase of the phase current running through the phase coil is ahead or behind with respect to the phase of BEMF of the phase coil based on signals CPI and EZ. At the same time, detector 72 outputs pulse signal PL slightly behind signal EZ. Counter 73 is an up-down counter including clock input terminal (CL) and up-down control terminal (U/D), and clock input terminal (CL) receives signal PL as well as up-down control terminal (U/D) receives signal LR. Counter 74 counts signals DIV, and its reset input terminal receives position detection signal Hu. Output signals CB and CA from counters 73 and 74 respectively are supplied to coincidence detector 75, which outputs phase advancing operation signal RST when signals CA and CB coincides with each other. Signal RST forms an output signal from phase advancing operator 70, and this output signal is supplied to reset input terminals of frequency divider 82 and position counter 83. Divider 82 and counter 83 are elements of driving waveform generator 80.

The structures of phase advancing controller 50, and its elements, i.e., phase current comparator 60 and phase advancing operator 70 are hereinbefore described specifically. Next, phase adjustment of a phase current running through a phase coil by phase advancing controller 50 detailed hereinafter.

Figure 6:
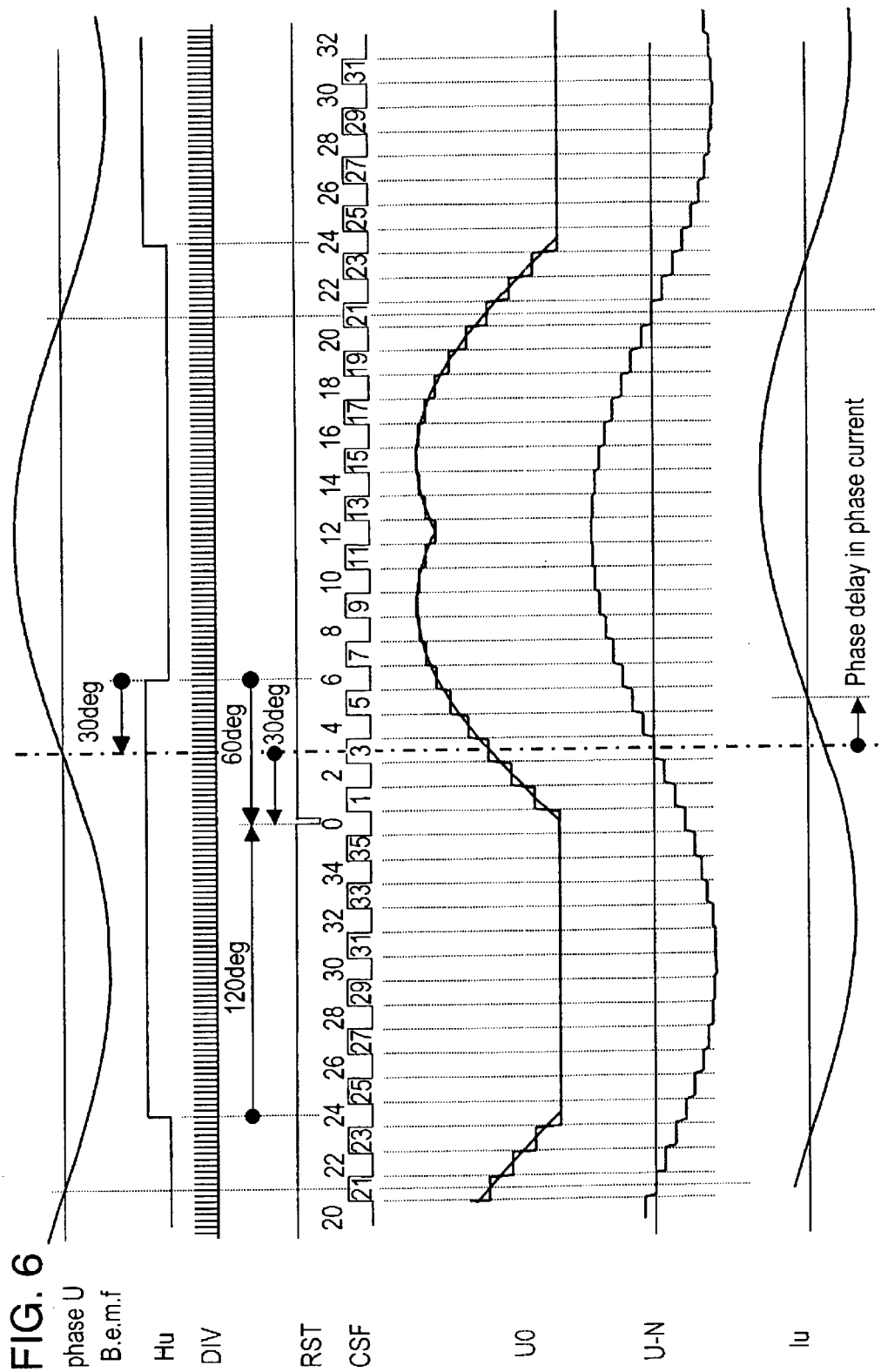
FIG. 6 shows phase relations among the waveforms of respective sections before the phases are adjusted (phase advancing control).

FIG. 6 describes phase relations among BEMF produced in phase U coil before the phase is adjusted, position detection signal Hu, phase advancing operation signal RST, driving waveform detection signal U0 (an output signal from driving waveform generator 80), waveform U-N of the voltage applied across phase U coil-end and neutral point N, and phase current Iu running through phase U coil.

As shown in FIG. 6, the BEMF of phase U coil is uniquely ahead by 30 degrees in electrical angles with respect to the fall of position detection signal Hu. Because position detector 101 is determined design-wise to be placed with respect to phase U coil in the stator such that the phase difference between the BEMF and signal Hu generally becomes 30 degrees in electrical angles. Position detector 103 of phase V coil and detector 105 of phase W coil are placed in a similar way, and the phase differences between respective BEMFs and position detection signals are similar to the case of phase U.

As shown in FIG. 1, signal RST works as a reset signal of frequency divider 82 and position counter 83 respectively. Thus, when signal RST is generated (signal RST turns to L), address signal CSF supplied from counter 83 becomes 0 (zero), and just after the generation of signal RST (at the time when signal RST turns to H), the address value of signal CSF starts varying. Driving waveform generator 80 selects a voltage level from levels L0–L9 set by series resistors 87 using a selection signal produced corresponding to the address values of signal CSF. Then generator 80 outputs driving waveform signals U0, V0, W0. This mechanism was already described. In other words, a generation of signal RST resets an address value of signal CSF at any timing, thereby controlling arbitrarily an output timing of signal U0, V0, W0. To be more specific, controlling of a timing of producing signal RST with respect to signal Hu allows adjusting arbitrarily a phase difference of driving waveform signal U0 of phase U with respect to BEMF of phase U. It is evident that the phase adjustment in phase U would entail the adjustment of the phase difference between the BEMF and the driving waveform signal in phase V and phase W.

In an initial status before the foregoing phase adjustment is done, as shown in FIG. 6, signal RST has been set in advance at the following condition in this first embodiment: Signal RST is set such that it is generated behind the rise of position detection signal Hu by 120 degrees in electrical angles (namely, ahead of the fall of signal Hu by 60 degrees in electrical angles, i.e., ahead of the BEMF of phase U by 30 degrees).

In this initial status, voltage waveform U-N applied across the first terminal of phase U coil and neutral point N has a phase coincident with that of the BEMF of phase U. However, phase current Iu has a phase behind waveform U-N due to inductance component of the driving coil. Phases V and W are in a similar status, therefore, the motor produces torque inefficiently in this status.

Figure 7:
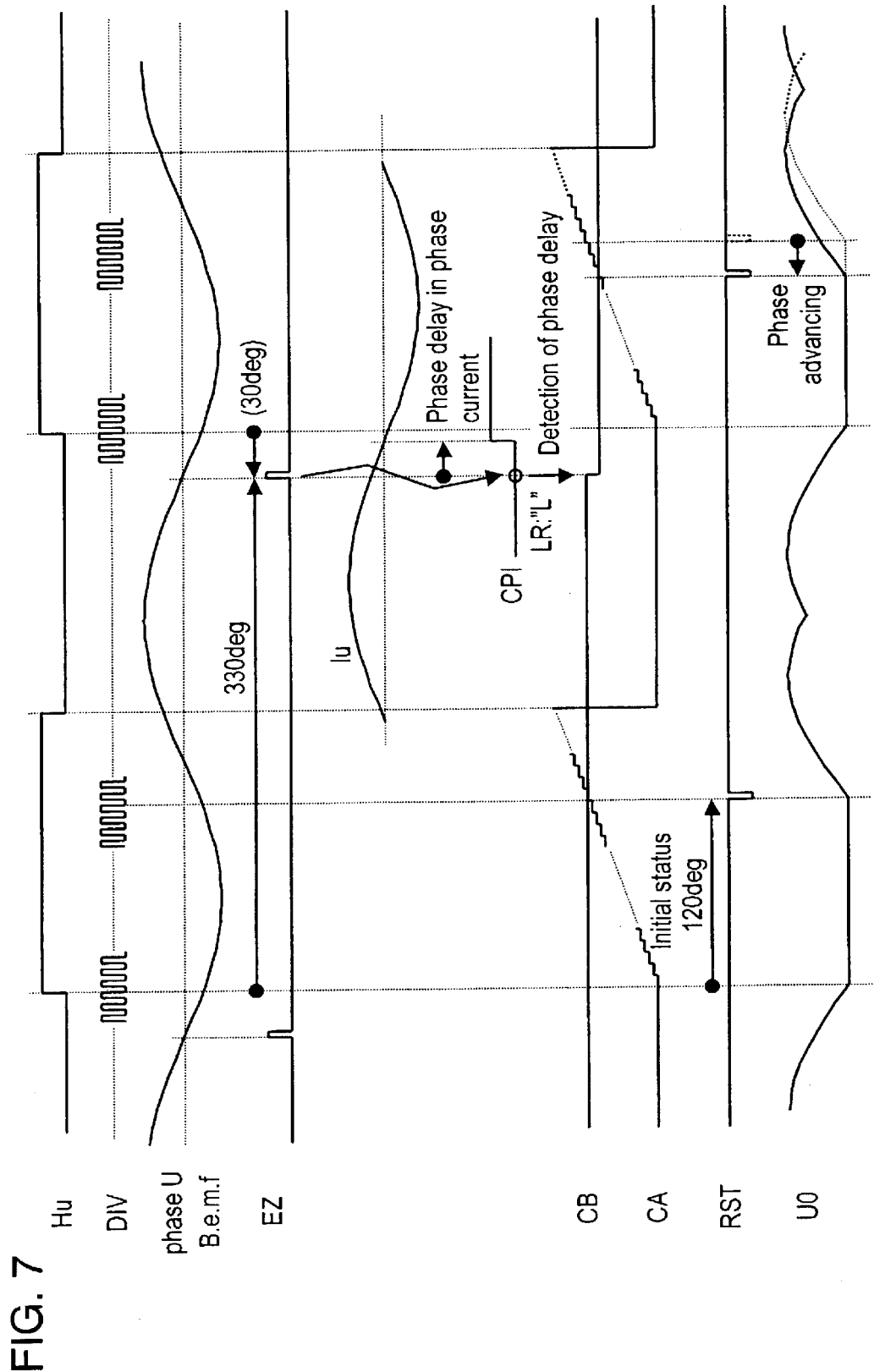
FIG. 7 illustrates operations at the phase adjustment (phase advancing control).

Next, this phase delay is adjusted and controlled at approx. zero, namely, an operation of the phase advancing control is described hereinafter. FIG. 7 illustrates how the phase is adjusted. The phase is adjusted mainly by phase advancing operator 70 shown in FIG. 1. In phase advancing operator 70, counter 74 is reset when position detection signal Hu turns to "L" and counter 74 makes its output signal CA zero (0). When signal Hu turns to "H", counter 74 counts signals DIV finely split by interpolator 81 and outputs signal CA. This operation of counter 74 is illustrated by signal CA shown in FIG. 7. The count value expressed by signal CA is compared with output signal CB from counter 73 by coincidence detector 75. When the value of signal CA coincides with that of signal CB, phase advancing operation signal RST is generated (signal RST turns to "L"). As discussed above, the phase difference of the driving waveform with respect of the BEMF of a phase coil can be adjusted with a generation timing of signal RST. However, in the initial status, a count value of counter 73 is preset such that signal RST is generated behind the rise of signal Hu by 120 degrees in electrical angles, and the preset value is expressed in signal CB.

BEMF zero-cross detector 71 detects a zero-cross timing of the BEMF of phase U coil. Detector 71 receives position detection signal Hu and signals DIV resulting from more finely splitting signal Hu. Detector 71 counts signals DIV from a timing of a rise of signal Hu, and when the count value reaches an electric angle corresponding to a zero-cross position of the BEMF of phase U, detector 71 outputs zero-cross timing pulse signal EZ.

In this first embodiment, as shown in FIG. 7, the BEMF phase is ahead of the rise of signal Hu by 30 degrees in electrical angles, or, behind 330 degrees (360−30=330) counting from the rise at one cycle before. In this embodiment, pulse signal EZ is supplied as a zero-cross detection signal at a timing of 330 degrees behind the rise of one cycle before of signal Hu. As previously discussed, the phase relation between signal Hu and the BEMF is uniquely determined, and it is evident that the zero-cross of BEMF can be detected with position detection signal Hu.

Phase difference detector 72 receives pulse signal EZ and output signal CPI from phase current comparator 60. Signal CPI includes level "L" or "H" changing to each other at the zero-cross of phase current Iu, as shown in FIG. 7. Signal CPI will be further detailed later. Detector 72 outputs signal LR by latching a level of signal CPI with pulse signal EZ. At this time, signal LR functions also as determining whether the phase of phase U current is ahead or behind the phase of the phase U BEMF. This function is detailed hereinafter.

Assume that signal CPI changes its level from "L" to "H" at a zero-cross timing of current Iu. Pulse signal EZ is generated at a zero-cross timing of the BEMF of phase U. If current Iu is behind the BEMF in phase, signal CPI does not yet change its level from "L" to "H" at the timing when signal EZ is generated, i.e., signal CPI still stays at level "L". On the contrary, if current Iu is ahead of the phase U BEMF in phase, signal CPI has already changed its level from "L" to "H" at the timing when signal EZ is generated, i.e., signal CPI has already stayed at level "H". As such, a level of signal CPI is latched at a timing when signal EZ is generated at a zero-cross of BEMF, thereby determining whether a phase of Iu is ahead or behind. In FIG. 7, signal EZ latches signal CPI, and latch signal LR shows "L", namely, it shows the phase of current Iu is behind the phase of BEMF.

When signal LR stays at level "L", counter 73 is set to count down, and when signal LR stays at level "H", namely, the phase of current Iu is ahead of the BEMF, counter 73 is set to count up.

Figure 8:
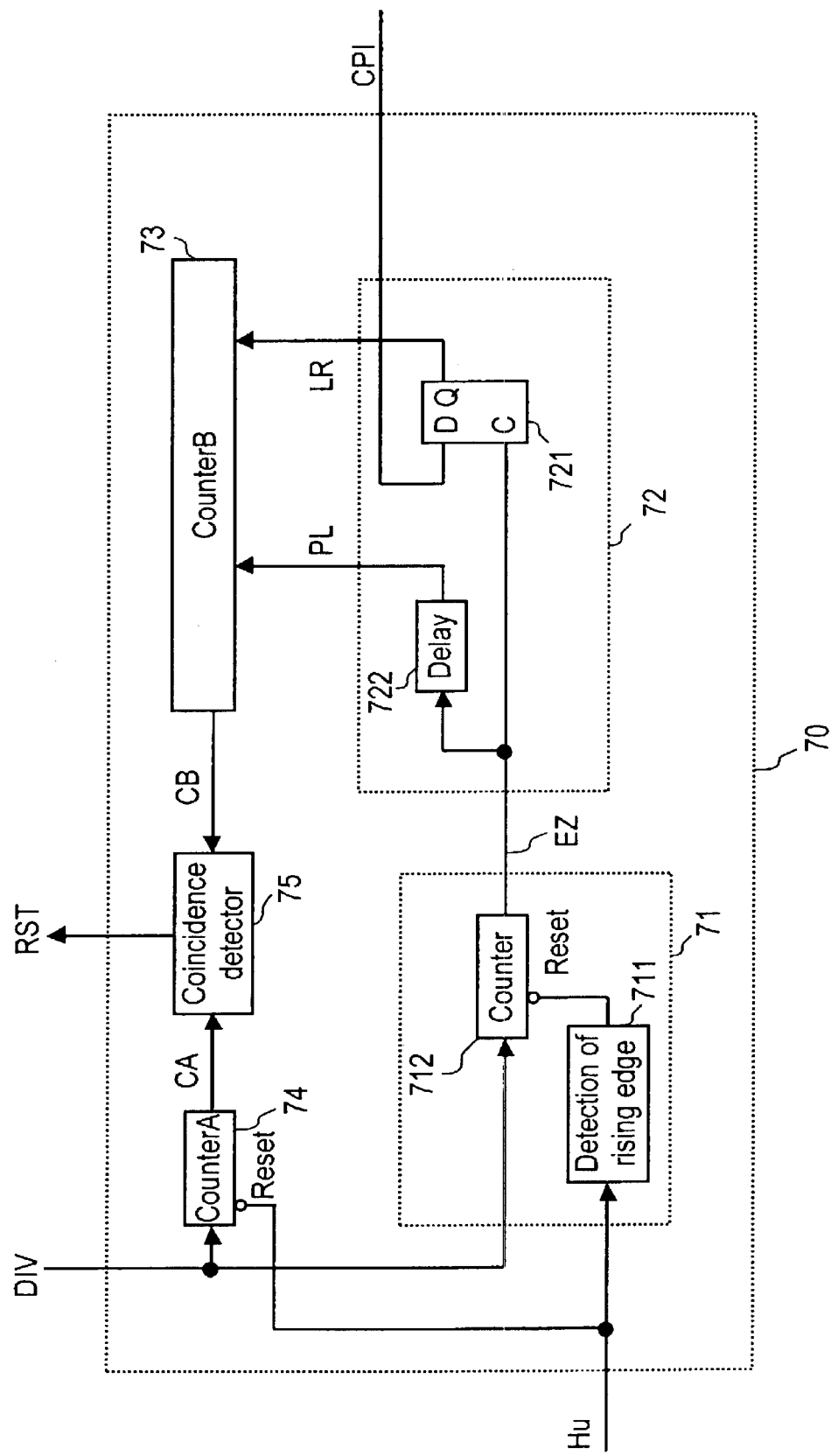
FIG. 8 shows a specific structure of a back electromotive force (BEMF) detector and a phase difference comparator.

Phase difference detector 72 outputs signal PL besides signal LR. Signal PL is a pulse signal that is delayed time-wise from pulse signal EZ, and works as a clock input signal to counter 73 and changes a count value of counter 73. The delay time of signal PL is set long enough for signal LR to be stabilized and supplied after signal CPI is latched by signal EZ. Signal PL starts changing the count value of counter 73 after counter 73 finishes counting down or up depending on the level of signal LR. FIG. 8 shows a structure of BEMF zero-cross detector 71 and phase difference detector 72.

The operation discussed hereinbefore is summarized as follows: When phase-U current Iu is behind phase-U BEMF in phase, a production of pulse signal EZ of zero-cross timing of the BEMF turns signal LR to level "L", which means current Iu is behind, and sets counter 73 in a count-down mode. After this mode setting, signal PL starts counter 73 to count down. On the contrary, when current Iu is ahead of the BEMF in phase, the production of signal EZ turns signal LR to level "H", which means current Iu is ahead, and sets counter 73 in a count-up mode. After this mode setting, signal PL starts counter 73 to count up.

The count value of counter 73 is supplied as signal CB, and as described previously, coincidence detector 75 compares signal CB with output signal CA from counter 74. A coincidence of signal CB with signal CA generates phase-advancing operation signal RST.

As discussed above, a timing generated by signal RST varies responsive to up and down of the count value of counter 73. For instance, when current Iu is behind in phase, a value of signal CB falls, and signal RST is generated earlier, as shown in FIG. 7, than a case when signal CB does not fall. This mechanism entails that driving waveform signal U0 of phase U is supplied earlier from driving waveform generator 80. In other words, a phase of signal U0 is advanced in order to reduce the phase delay of current Iu. On the contrary, when the phase of current Iu is ahead, the value of signal CB rises, and a production of signal RST delays from the case when signal CB does not rise. This mechanism entails that driving waveform signal U0 of phase U is supplied with delay from driving waveform generator 80. In other words, a phase of signal U0 is delayed in order to reduce the phase advance of current Iu.

As discussed above, the count value (signal CB) of counter 73 varies the production timing of signal RST, so that the phase of driving waveform signal U0 is controlled. As a result, the phase difference between the BEMF of phase U and current Iu of phase U can be automatically and eventually adjusted to be approx. zero (0). Meanwhile, FIG. 7 shows that the count value of counter 73 falls by "3"; however, this is for convenience for writing and does not have any specific meaning. If a finer phase adjustment is needed, counter 73 can be set to count-up or -down in steps of minimal "1" without any problems.

Figure 9:
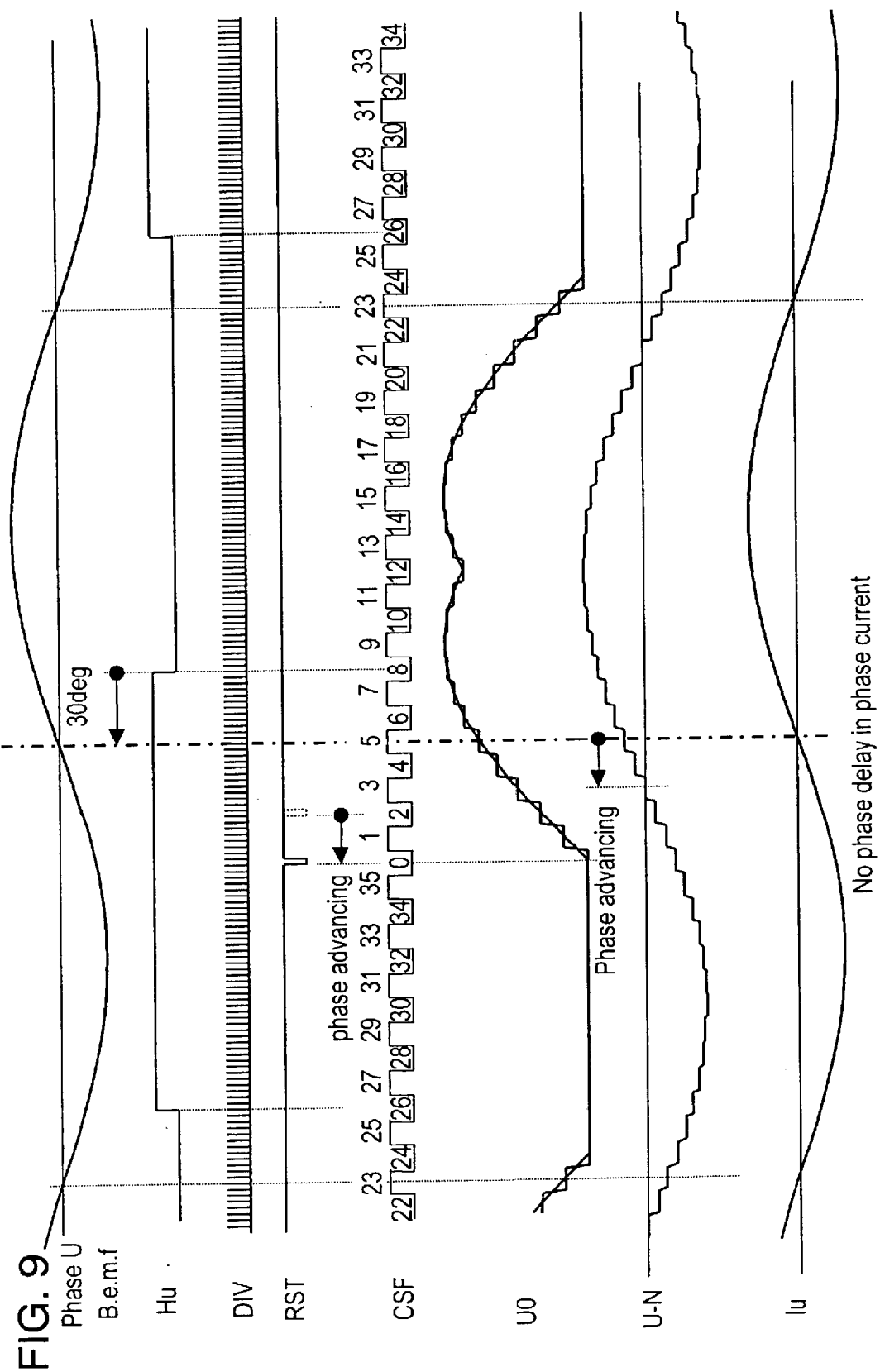
FIG. 9 shows phase relations among the waveforms of respective sections after the phases are adjusted (phase advancing control).

FIG. 9 shows a status after a phase is adjusted. In FIG. 9, driving waveform signal U0 is phase-adjusted by the amount of "phase advancing" marked in the drawing (in electrical angles). This phase adjustment accompanies the phase of voltage U-N across phase U coil to advance, so that the phase delay of current Iu with respect to the BEMF of phase U is adjusted to zero (0). It is evident that the phase adjustment to zero in phase U automatically adjusts phase differences in phase V and phase W to zero (0).

The phase differences between the BEMFs of respective phases and the currents running through the respective phase coils can be always adjusted to generally zero (0) as discussed above, so that the phase differences become zero in any conditions including changes of a load and an rpm. As a result, although a motor has a large inductance component and a large electrical time constant, the motor can spin and produce torque at the highest efficiency.

Signal CPI was described previously that it had level "L" or "H" which changed to each other at the zero-cross of phase U current Iu. Hereinafter detailed is an operation of phase current comparator 60 that outputs this signal CPI. FIG. 1 shows a structure of comparator 60. Sample pulse generator 62 outputs first pulse signal SPL1 at a timing when phase V is coupled to a positive feeder line (first feeder line) of dc power supply 10, and phases U, W are coupled to a negative feeder line (second feeder line). This coupling status of the three phases is referred to as a first coupling status. Generator 62 outputs second pulse signal SPL2 at a timing when phases U, V are coupled to the positive feeder line and phase W is coupled to the negative feeder line. This coupling status of the three phases is referred to as a second coupling status.

Sample pulse generator 62 recognizes which one is the present status, i.e., the first coupling status or the second coupling status, using output signals G1H, G1L, G2H, G2L, G3H, G3L from on-delay 40. Those signals are fed into gate driver 30. For instance, during the first coupling status, transistors 21, 22, 23, 24, 25, 26 of power feeder 20 are turned OFF, ON, ON, OFF, OFF, ON respectively. At this time, signals G1H, G1L, G2H, G2L, G3H, G3L supplied to gate driver 30 are at level "L", "H", "H", "L", "L", "H" respectively. Detecting a logical level of those signals allows recognizing the first coupling status. On the other hand, during the second coupling status, transistors 21, 22, 23, 24, 25, 26 of power feeder 20 are turned ON, OFF, ON, OFF, OFF, ON respectively. At this time, signals G1H, G1L, G2H, G2L, G3H, G3L supplied to gate driver 30 are at level "H", "L", "H", "L", "L", "H" respectively. Detecting a logical level of those signals allows recognizing the second coupling status.

During the first coupling status, an output of pulse signal SPL1 from sample pulse generator 62 turns on analog switch 63, then capacitor 64 holds an output voltage of differential amplifier 61. This output voltage is produced by amplifying the detected voltage VIcom of common current Icom running through the negative feeder line of dc power supply 10. Thus it can be considered that capacitor 64 holds a value of common current Icom in the first coupling status.

Value SH, held by capacitor 64, of common current Icom is compared by comparator 65 with various values of common current Icom which varies depending on various coupling status, such as the first and the second coupling statuses and other statuses generated by on-off of respective transistors of power feeder 20. The resulting signal of this comparison by comparator 65 is latched by D-type flip-flop 66 at a timing of generating pulse signal SPL2 that is generated in the second coupling status. In other words, only a result of comparing common current Icom in the first coupling status with that in the second coupling status is extracted from the resulting signal by comparator 65 and the extracted signal is supplied to D-type flip-flop 66. An output signal from flip-flop 66 is signal CPI discussed previously. The description above can be summarized as follows: Common current Icom in the first coupling status is compared with that in the second coupling status, and the resulting signal is signal CPI.

Signal CPI obtained through the operation discussed above is a signal detected at zero-cross of current Iu of phase U, and changes its level from "L" to "H" at the zero-cross timing of current Iu. This is further detailed hereinafter.

Figure 10:
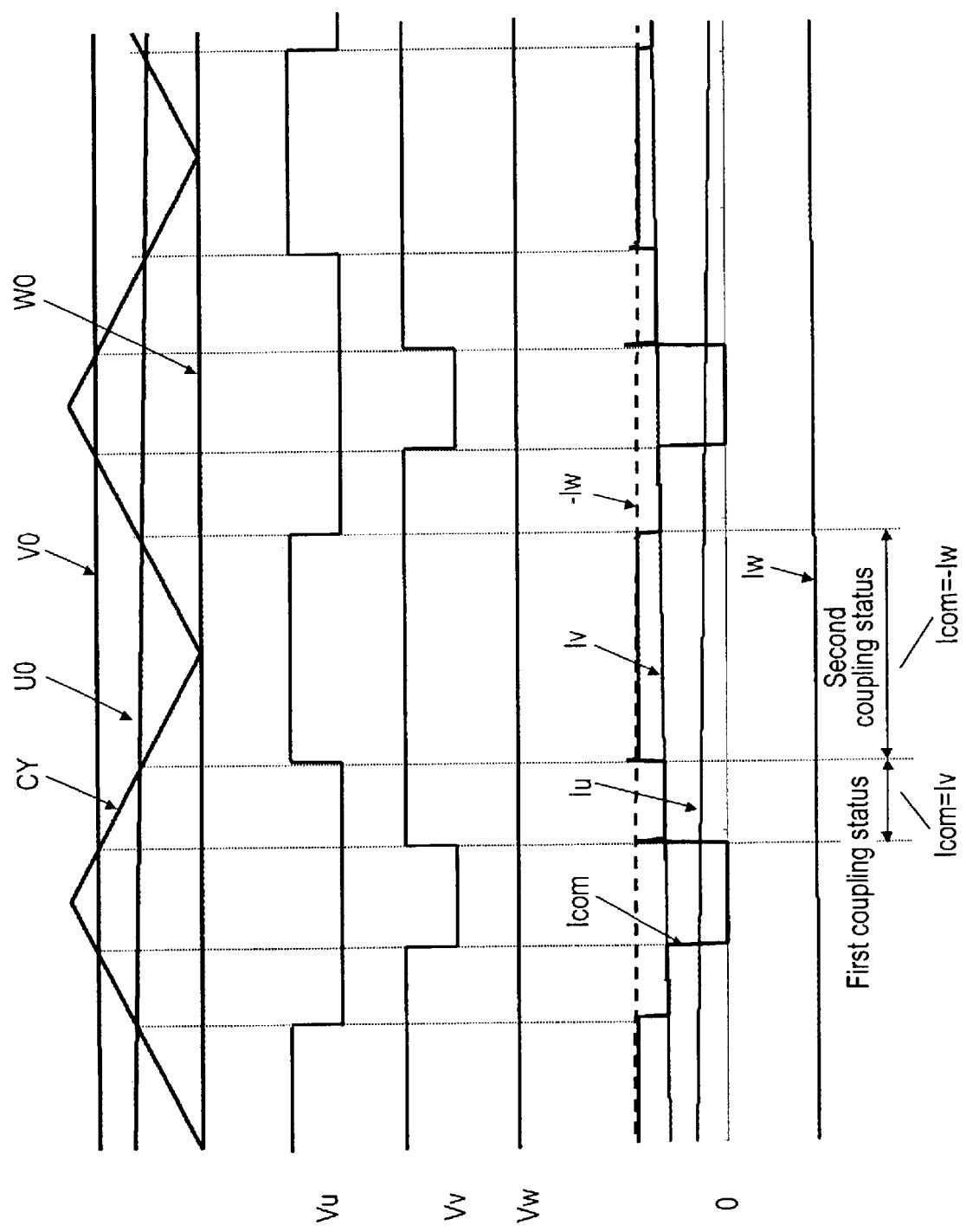
FIG. 10 shows a relation between a common current and a phase current in the first and the second coupling statuses.

FIG. 10 shows relations among voltages Vu, Vv, Vw of three-phase output terminals of power feeder 20, common current Icom, and phase currents Iu, Iv, Iw. During the first coupling status, voltages Vu, Vv, and Vw are respectively at level "L", "H", and "L". At this time transistors 21, 22, 23, 24, 25 and 26 are respectively turned "off", "on", "on", "off", "off", and "on". In this first coupling status, a first current runs from the positive terminal of dc power supply 10 and passes through transistor 23, phase V coil 13, neutral point N, phase U coil 11, transistor 22, common current detecting resistor 27 and returns to the negative terminal of dc power supply 10. A second current runs from the positive terminal of dc power supply 10 and passes through transistor 23, phase V coil 13, neutral point N, phase W coil 15, transistor 26, common current detecting resistor 27 and returns to the negative terminal 10 of dc power supply 10. Thus in the first coupling status, current Iv running through phase-V coil is common current Icom, namely, Icom=Iv, which means current Iv can be detected.

On the other hand, during the second coupling status, voltages Vu, Vv, and Vw are respectively at level "H", "H", and "L". At this time transistors 21, 22, 23, 24, 25 and 26 are respectively turned "on", "off", "on", "off", "off", and "on". In this second coupling status, a first current runs from the positive terminal of dc power supply 10 and passes through transistor 21, phase U coil 11, neutral point N, phase W coil 15, transistor 26, common current detecting resistor 27 and returns to the negative terminal of dc power supply 10. A second current runs from the positive terminal of dc power supply 10 and passes through transistor 23, phase V coil 13, neutral point N, phase W coil 15, transistor 26, common current detecting resistor 27 and returns to the negative terminal 10 of dc power supply 10. Assume that a direction of a current flowing from three-phase output terminals of power feeder 20 to neutral point N is positive, and the reversal flowing direction is negative. Then in the second coupling section, phase-W coil current "−Iw" is common current Icom, namely, Icom=−Iw. Thus Iw can be detected in the second coupling status.

As it is clearly understood from FIG. 10, the first and the second coupling statuses occur at timings close to each other within one cycle of PWM carrier signal CY Thus phase V current Iv detected in the first coupling status and phase W current Iw detected in the second coupling status can be considered as the currents practically having the same timing. Because the current running through each phase coil cannot change in a short time due to the inductance component of each coil. In other words, phase currents of phase V and phase W out of coil currents of the three phases can be detected almost simultaneously. The remaining phase U current Iu can be found with ease because of the principle that the three-phase currents total up to zero (0).

At the zero-cross timing when phase U current Iu becomes zero, in particular, the relation of Iv=−Iw holds. This means that the common current (=Iv) in the first coupling status is compared with that in the second coupling status (common current=−Iw), and the coincidence of the two common currents allows detecting the zero-cross timing of phase U current.

Figure 11:
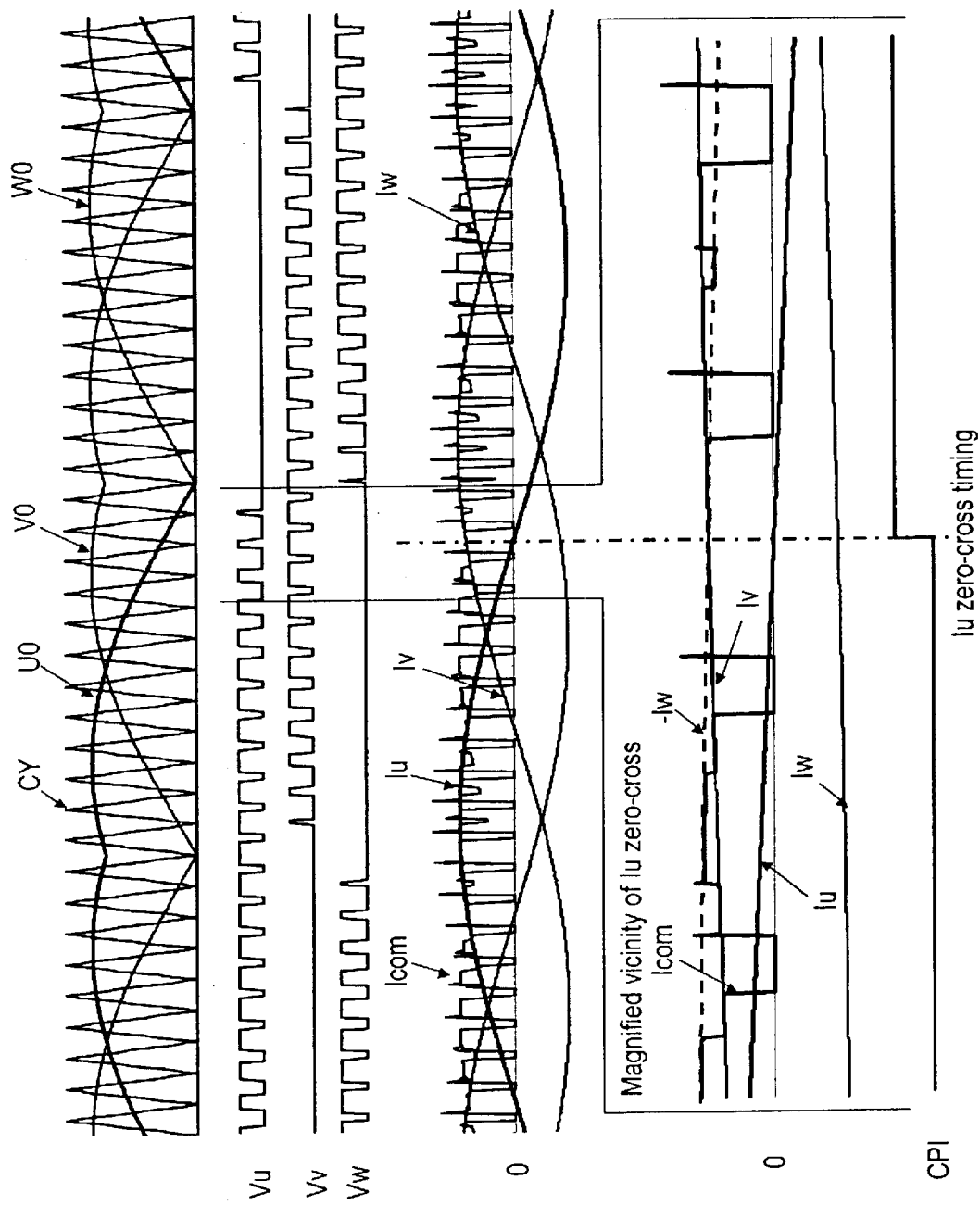
FIG. 11 illustrates how to detect a zero-cross of a phase current by comparing the common currents in the first and the second coupling statuses.

The above discussion makes it clear that signal CPI obtained by comparing common current Icom in the first coupling status with that in the second coupling status is a signal for detecting a zero-cross of phase U current Iu. Before and after the zero-cross of current Iu, the common current in the first and the second coupling statuses, namely, a relation of large and small between Iv and −Iw is switched, so that signal CPI changes its level from "L" to "H" across the zero-cross of current Iu. FIG. 11 illustrates this situation.

In this first exemplary embodiment, when the common current (=Iv) in the first coupling status is smaller than that in the second coupling status (common current=−Iw), namely, Iu>0, signal CPI turns to level "L". When the common current in the first coupling status (=Iv) is larger than that in the second coupling status (=−Iw), namely, Iu<0, signal CPI turns to level "H". Phase current comparator 60 is structured to work as discussed above.

Phase current comparator 60 extracts the information about the phase currents running through the driving coils only from the information of common current Icom, thereby producing phase-U zero-cross signal CPI. It is widely known that a current sensor such as a current transformer is used to detect a phase current. However, this embodiment proves that detecting a common current allows detecting a phase current, so that common current detecting resistor 27 can detect the phase current. Thus this embodiment can simplify the structure and lower the cost.

As discussed above, in the first embodiment, phase current comparator 60 compares common current Icom running through the feeder line in the first coupling status with that in the second coupling status, and outputs the resulting signal as signal CPI to phase advancing operator 70. Operator 70 latches signal CPI with pulse signal EZ generated at the zero-cross of BEMF in the phase-U coil, thereby determining whether phase-U current Iu is ahead or behind the BEMF in phase. Phase advancing operator 70 then outputs phase advancing operation signal RST to driving waveform generator 80, so that signal RST adjusts the respective phases of driving waveform signals U0, V0, W0 in order to reduce the delaying amount or the advancing amount of phase current Iu. As a result, the phases can be automatically adjusted such that the phases of BEMFs induced in the respective phase-coils coincide with the phases of ac (sine-wave current) running through the coils. This mechanism allows the motor to spin always efficiently even, e.g., a load to the motor changes.

In this embodiment, in the first coupling status, phase V is coupled to the positive feeder line of dc power supply 10, and phases U, W are coupled to the negative feeder line. In the second coupling status, phases U, V are coupled to the positive feeder line and phase W is coupled to the negative feeder line. However, instead of the foregoing first coupling status, phase V can be coupled to the negative feeder line and phases U, W can be coupled to the positive feeder line. As well as instead of the foregoing second coupling status, phases U, V can be coupled to the negative feeder line and phase W can be coupled to the positive feeder line. In this case, the phase currents can be also compared with the common current although polarities are reversed when the current is detected. In other words, signal CPI for detecting the zero-cross of phase U is also obtainable.

Meanwhile, when the phases of BEMFs induced in the respective phase-coils coincide with the phases of ac (sine-wave current) running through the coils and the motor is driven, the phases of driving waveform signals U0, V0, W0, or the phases of voltage U-N, V-N, W-N applied across the neutral point and coil-terminals of the respective phases are positively adjusted in an advancing direction, i.e., phase advanced. This is as a matter of course because a delay of the ac due to inductance component included in the phase coils is adjusted to decrease.

In the case when an amount of phase adjustment (hereinafter referred to as "phase advancing amount") in the advancing direction is great, e.g., 30 degrees or more in electrical angles from the initial status prior to the adjustment, the following measure is taken. Phases V and W are coupled to the positive feeder line of dc power supply 10 and phase U is coupled to the negative feeder line. This is called a third coupling status. Common current Icom in the third coupling status is compared with zero, so that the zero-cross of phase-U current Iu can be detected. This mechanism is detailed with reference to FIG. 12 through FIG. 14.

Figure 12:
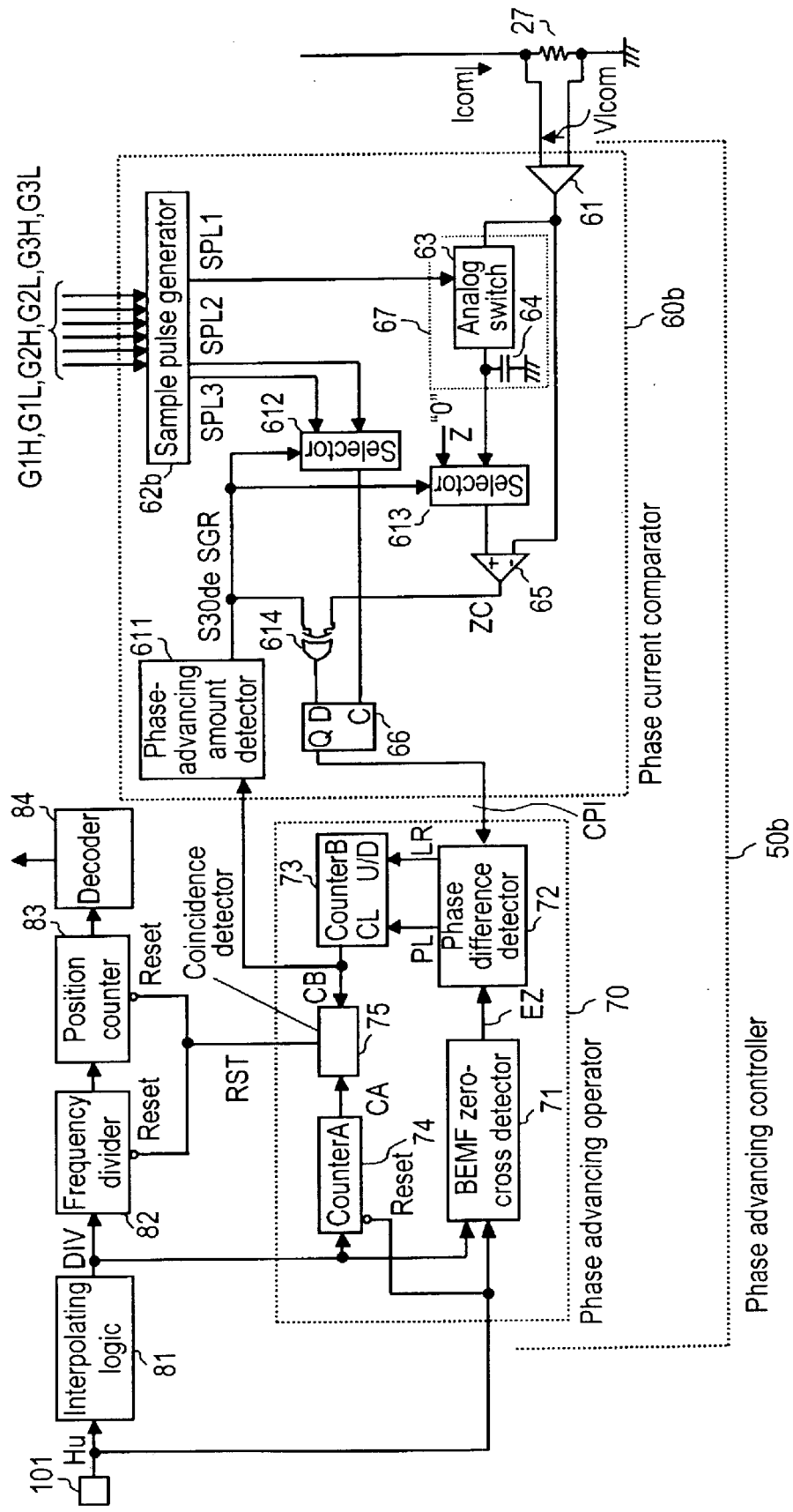
FIG. 12 shows a specific structure of a phase advancing controller when an amount of phase advancing is large.

FIG. 12 shows a structure of phase advancing controller 50*b* in the case of large amount of phase advancing, and particularly details the structure of phase current comparator 60*b*. In controller 50*b* shown in FIG. 12, phase advancing amount detector 611, selectors 612, 613, and exclusive OR (EX-OR) gate 614 are added in comparator 60*b*, and sample pulse generator 62*b* is set to output pulse signal SPL3 in the third coupling status. The others stay basically unchanged from those in phase advancing controller 50 shown in FIG. 1. Phase advancing detector 611 detects whether or not an amount of phase advancing is over 30 degrees in electrical angles with respect to the initial status. When the amount is 30 degrees or more, detector 611 turns output signal SGR to level "H". The amount of phase advancing is detected with e.g., count-value signal CB of counter 73 prepared in phase advancing operator 70. An amount of phase adjusting of the driving waveform signal is controlled with signal CB, thus it is evident from the previous description that the amount of phase advancing can be detected with signal CB.

First, there is a case when an amount of phase advancing is small and output signal SGR from detector 611 stays at level "L". This case is described hereinafter. In this case, selector 612 selects signal SPL2 out of signals SPL2 and SPL3 supplied from sample pulse generator 62*b*, and inputs it to D-type flip-flop 66. Signal SPL2 is the same one that is supplied from sample pulse generator 62 shown in FIG. 1, and it is the pulse signal generated in the foregoing second coupling status. Selector 613 selects signal SH supplied from sample & hold circuit 67 out of zero-level signal Z and signal SH, and inputs it to comparator 65. Since signal SGR stays at level "L", EX-OR gate 614 inputs the same logical level as an output logic from comparator 65 to D-type flip-flop 66. Eventually, when signal SGR stays at level "L", phase current comparator 60b shown in FIG. 12 processes signals with selectors 612, 613 and EX-OR gate 614 in the same way as phase current comparator 60 shown in FIG. 1 does. Since the operation was already described in the case of comparator 60, the detailed description thereof is omitted here.

On the other hand, there is another case where an amount of phase advancing is large, and signal SGR supplied from detector 611 stays at level "H". This case is described hereinafter. In this case, selector 612 selects signal SPL3 and inputs it to D-type flip-flop 66. Selector 613 selects signal Z and inputs it to comparator 65. Since signal SGR stays at level "H", EX-OR gate 614 inputs the logical level reversal to the logic supplied from comparator 65 to D-type flip-flop 66. Through those operations, when signal SGR stays at level "H", phase current comparator 60b outputs a result of comparing common current Icom in the third coupling status with the zero value as signal CPI. This is further detailed as follows:

An inverting input terminal of comparator 65 receives a voltage amplified by differential amplifier 61 from detected voltage VIcom of common current Icom. In other words, various voltages responsive to common current Icom which varies depending on various coupling statuses of the driving coils are supplied to the inverting input terminal of comparator 65. Meanwhile, the PWM operations of the respective transistors in power feeder 20 form the foregoing coupling statuses. Each one of those voltages supplied is compared with zero-level signal Z selected by selector 613, and inverted by comparator 65. Then the voltage is further inverted by EX-OR gate 614 for logic-matching, and fed into a data-input terminal of D-type flip-flop 66. Signal Z has a constant voltage value equal to an output voltage from differential amplifier 61 when common current Icom takes a value of zero. As a result, the data input terminal of D-type flip-flop 66 receives a resulting signal produced by comparing a zero value with a value of common current Icom which varies depending on the various coupling statuses of the driving coils.

On the other hand, a clock input terminal of D-type flip-flop 66 receives pulse signal SPL3 selected by selector 612. Signal SPL3 is supplied when the driving coils are in the third coupling status, and an input of signal SPL3 to the clock input terminal of flip-clop 66 extracts only a comparison result signal in the third coupling status out of the foregoing resulting signals produced by comparing a zero value with values of common current Icom varying. Then the extracted signal is supplied from phase current comparator 60b as output signal CPI.

What is the third coupling status is described hereinafter. In the third coupling status, phase V and phase W are coupled to the positive feeder line of dc power supply 10, and phase U is coupled to the negative feeder line. To be more specific, in the third coupling status, voltages Vu, Vv, and Vw of three-phase output terminals of power feeder 20 are respectively at level "L", "H", and "H". At this time transistors 21, 22, 23, 24, 25 and 26 are respectively turned "off", "on", "on", "off", "on", and "off". In this third coupling status, a first current runs from the positive terminal of dc power supply 10 and passes through transistor 23, phase V coil 13, neutral point N, phase U coil 11, transistor 22, common current detecting resistor 27 and returns to the negative terminal of dc power supply 10. A second current runs from the positive terminal of dc power supply 10 and passes through transistor 25, phase W coil 15, neutral point N, phase U coil 11, transistor 22, common current detecting resistor 27 and returns to the negative terminal of dc power supply 10. Assume that a direction of the current flowing from three-phase output terminals of power feeder 20 to neutral point N is positive, and the reversal flowing direction is negative, in the third coupling status, phase-U coil current "–Iu" is common current Icom, namely, Icom=–Iu. Thus phase U current Iu can be detected in the third coupling status. The detected phase-U current is compared with a zero level, so that the zero-cross of phase-U current is detected with ease.

Figure 13:
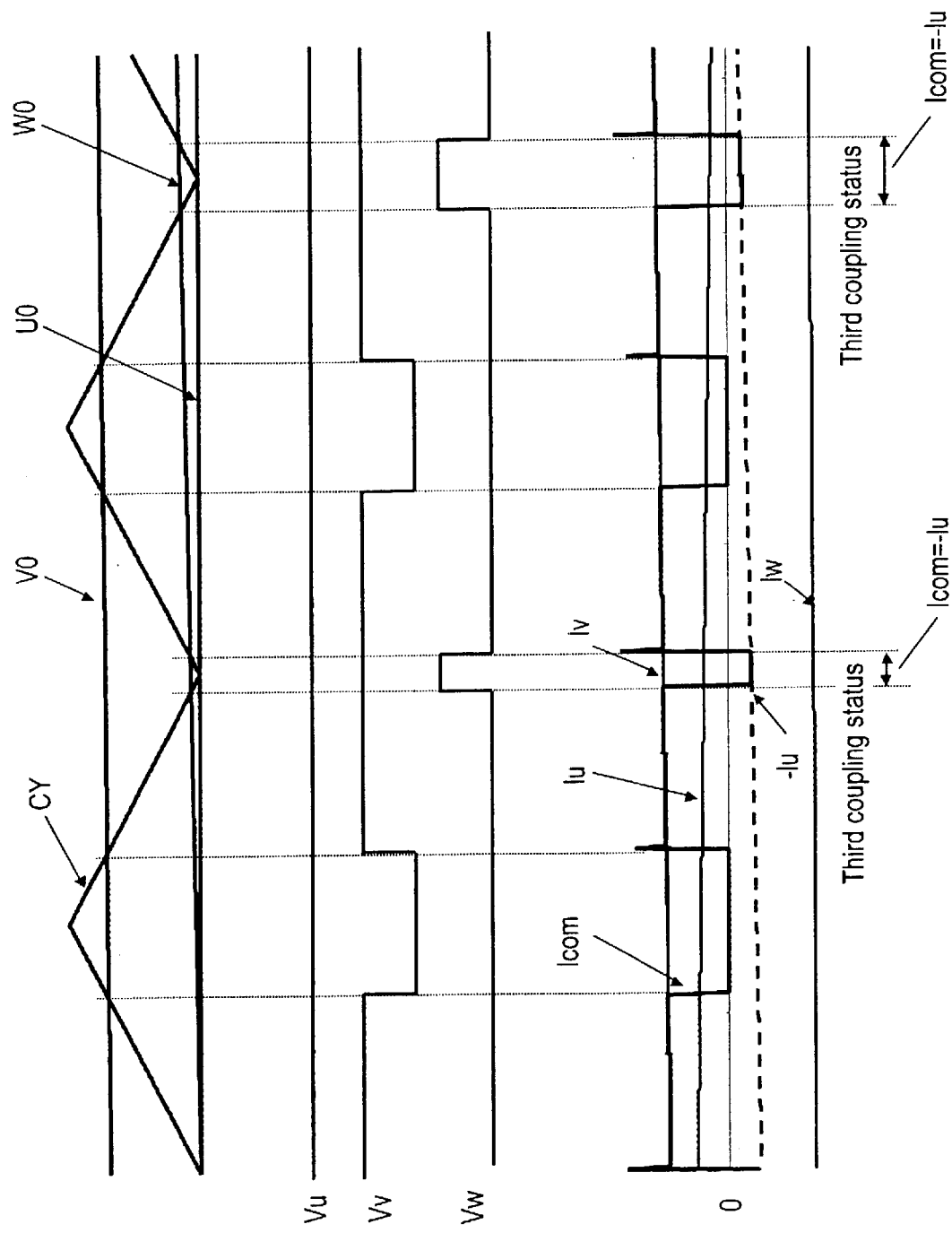
FIG. 13 shows a relation between a common current and a phase current in a third coupling status.

FIG. 13 shows relations among voltages Vu, Vv, Vw of three-phase output terminals of power feeder 20, common current Icom, and phase currents Iu, Iv, Iw. The relations are found around the timing where the third coupling status occurs. In FIG. 13, the relation of Icom=–Iu is recognized in the third coupling status.

Figure 14:
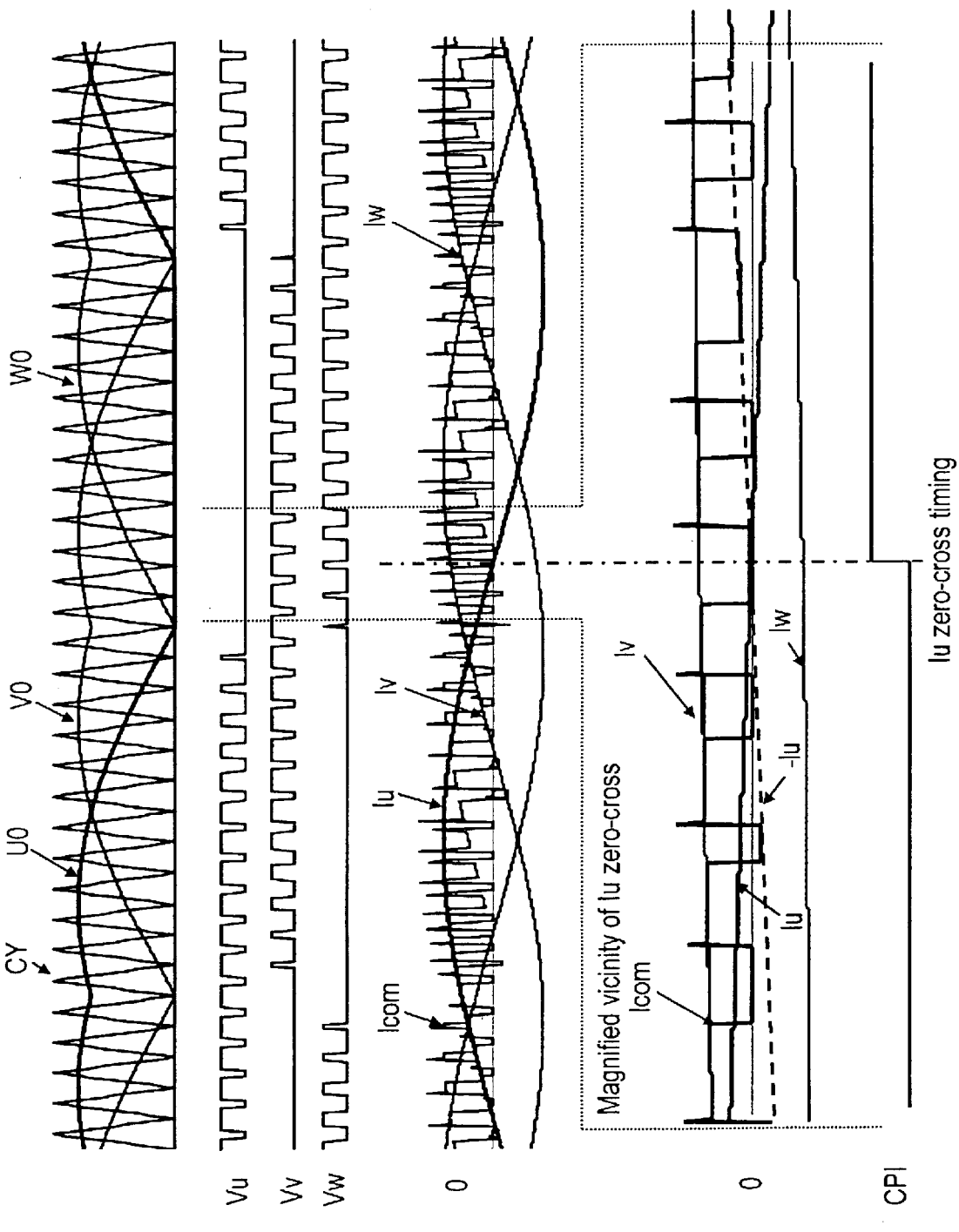
FIG. 14 illustrates how to detect a zero-cross of a phase current by comparing the common currents in the third coupling status.

FIG. 14 illustrates that zero-cross detection signal CPI of phase-U current is supplied by comparing Icom with a zero value. Meanwhile, the third coupling status does not occur at the timing near the zero-cross of phase-U current when an amount of phase advancing is small. Phase current comparator 60 shown in FIG. 1 thus detects the zero-cross of phase U by comparing the phase-V current detected in the first coupling status with the phase-W current detected in the second coupling status. However, in the case of a large amount of phase advancing, the third coupling status occurs at the timing near the zero-cross of phase-U current. Therefore, the phase-U current can be detected directly from common current Icom. Then as phase current comparator 60b shown in FIG. 12 does, the phase-U zero-cross can be detected by comparing a zero value with the phase-U current detected in the third coupling status. After the detection of the zero-cross of the phase-U current, signal CPI is supplied, and the phases are adjusted in the same way as the case shown in FIG. 1.

As discussed above, in the embodiment shown in FIG. 12, the driving waveform is phase-adjusted in the motor having a larger inductance component which increases an amount of phase advancing, so that the motor can be driven efficiently.

In the embodiment shown in FIG. 12, in the third coupling status, phases V, W are coupled to the positive feeder line of dc power supply 10, and phases U is coupled to the negative feeder line. However, instead of the foregoing third coupling status, phases V, W can be coupled to the negative feeder line and phase U can be coupled to the positive feeder line. In this case, the phase currents can be also compared with the common current although polarities are reversed when the current is detected. In other words, signal CPI for detecting the zero-cross of phase U is also obtainable.

In the foregoing embodiment, the phase adjustment of the driving waveform can be done at intervals of "n" cycles in electrical angles (n=an integer equal to 1 or more than 1). This can be realized with ease by the following arrangement: zero-cross timing pulse signal EZ is set to be supplied from BEMF zero-cross detector 71 of phase advancing operator 70 at intervals of "n" cycles in electrical angles. In this case, errors in magnetizing rotor-magnets or mounting position-detectors are approx. the same at every cycle in electrical angles thus the phase advancing can be controlled in a stable manner.

In the foregoing embodiment, the phase adjustment of the driving waveform can be done at intervals of "n" cycles in mechanical angles (n=an integer equal to 1 or more than 1). This can be realized with ease by the following arrangement: pulse signal EZ is set to be supplied at intervals of "n" degrees in mechanical angles. In this case, errors due to mechanical unbalance such as eccentricity of the rotor, in addition to the errors in magnetizing the rotor-magnets or mounting the position detectors, are approx. the same at every interval in mechanical angles thus the phase advancing can be controlled in the more stable manner.

In the foregoing embodiment, the phase adjustment of the driving waveform can be done at intervals of "1/m" cycle in electrical angles (m=2, 3, or 6). A use of this interval has the following meaning: in the embodiment, the phase advancing control is done using the information only about one-side zero-cross timing of phase U; however, both-sides the zero-cross timings of phase U, and yet, the information about the zero-cross timing of phases V, W can be used for the phase advancing control. In the case where the errors in magnetizing the rotor-magnets or mounting the position detectors, or the errors due to mechanical unbalance such as eccentricity of the rotor are small enough, the phase advancing control can be done with those lots of information, so that responsiveness of the control can be increased.

In the foregoing embodiment, the phase advancing control can be done in the following case: a result of comparing common currents at the timing of phase advancing control over the driving waveform coincides with the past two results or more at the same timing. In this case, if an error due to noises occurs temporarily in a comparison result of a common current, the phase advancing can be controlled in a stable manner.

In the foregoing embodiment, the phase of the driving waveform can be adjusted when an rpm of the rotor is beyond a desirable speed. The motor, in general, bears a lighter load at a lower rpm, and the phase current as well as the common current running through the driving coils is small. At this time, the phase current produces little phase-delay due to inductance component of the driving coil. Therefore, when the rotor is driven at a low speed, sometimes it had better keep from adjusting the phases rather than do it by detecting a small common current with an effort. In this case, the phases can be adjusted when the rotor is driven at a higher speed, and the phase-delay due to the inductance component starts influencing the motor efficiency. The higher driving speed increases a load current and the common current, so that the common current can be detected more accurately and the phases can be adjusted more positively.

In the foregoing embodiment, the phases of the driving waveform can be adjusted when load torque of the motor is beyond a desirable level. When the load torque is small, the phase current and the common current running through the driving coils are small. At this time, the phase current produces little phase-delay due to inductance component of the driving coil. Therefore, when the load torque is small, sometimes it had better keep from adjusting the phases rather than do it by detecting a small common current with an effort. In this case, the phases can be adjusted when the load torque becomes large, and the phase-delay due to the inductance component starts influencing the motor efficiency. The larger load torque increases the common current, so that the common current can be detected more accurately and the phases can be adjusted more positively.

Processing signals in interpolating a position signal, generating a driving waveform, and controlling phase-advancing can be done, not to mention, with a microprocessor or a software.

According to the present invention, as discussed above, a power feeder feeds respective phase-coils with an ac changing consecutively in a sine waveform based on driving waveforms of the respective phases, the driving waveforms being generated by a driving waveform generator. The driving waveform is phase-adjusted by a phase advancing controller, and a phase advancing control is done such that a phase of BEMF of each one of the respective phase-coils coincides with approx. a phase of the ac running through each coil. In the case of the phase advancing control, common currents in the first and the second coupling statuses are compared with each other, thereby detecting a zero-cross of a phase current.

In the case of a large amount of phase advancing, the common current in the third coupling status is compared with a zero value, thereby detecting the zero-cross of the phase current. In other words, a current transformer is not needed for detecting a phase current, but it can be detected with a common current, so that a simple structure is achievable. A production of a driving waveform for feeding respective phase-coils with an ac in a sine wave does not need a ROM, or a D/A converter, but it can be produced by a simpler structure such as using a selector for selecting a voltage from various voltage levels determined by series resistors. This structure allows the motor driver of the present invention to drive a motor always efficiently thanks to an ac in sine-waveform with low torque ripples, fewer vibrations, lower noises, in a simple structure and at an inexpensive cost, even if a load or an rpm of the motor changes. If the motor has a large inductance component and a large electrical time constant, the motor driver can drive the motor in the same manner as discussed above and free from a phase-delay in a phase-current.

Exemplary Embodiment 2

Figure 15:
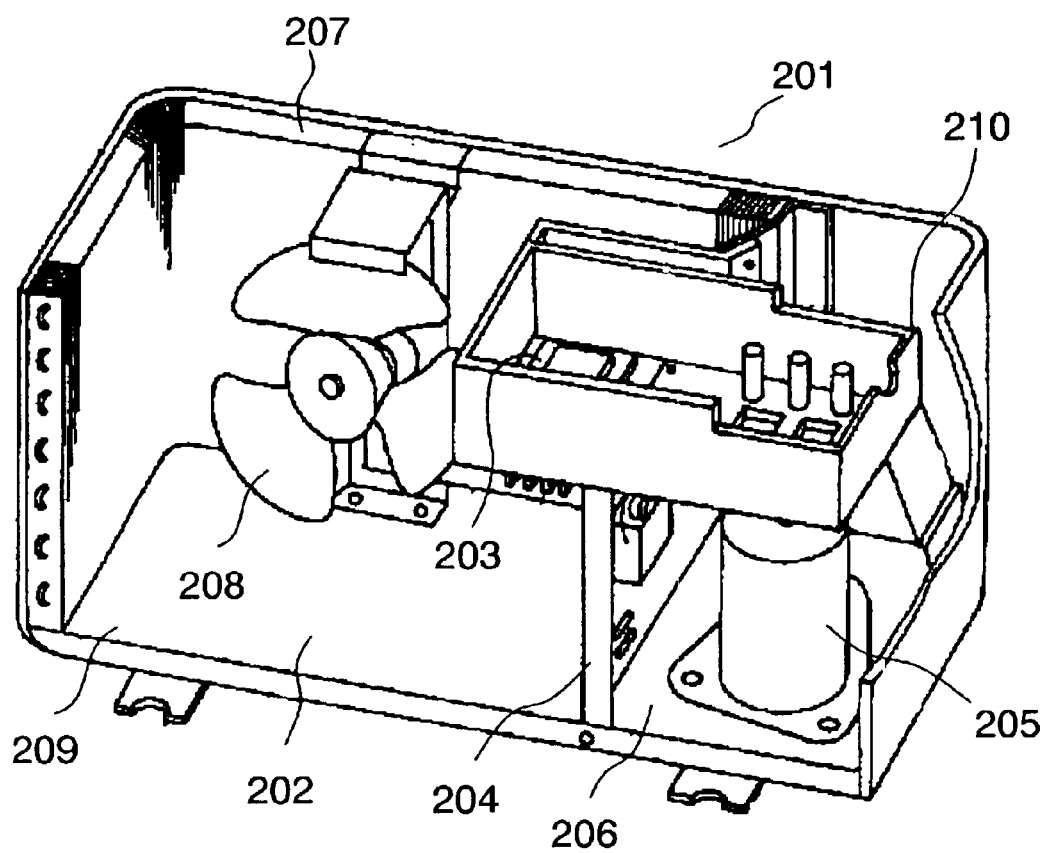
FIG. 15 shows a structure of an outdoor unit of an air conditioner that employs the motor driver of the present invention in the fan motor.

FIG. 15 illustrates an outdoor unit of an air conditioner using a fan motor employing the motor driver of the present invention. In FIG. 15, outdoor unit 201 is partitioned into compressor room 206 and heat exchanging room 209 by partition 204 vertically disposed on bottom plate 202. Compressor 205 is disposed in room 206, and heat exchanger 207 as well as blower fan-motor 208 is disposed in room 209. Box 210 containing electrical equipment is disposed on partition 204.

Fan motor 208 is structured by mounting a blower fan to the rotary shaft of a brush-less DC motor. Fan motor 208 is driven by a motor driver housed in box 210. Fan motor 208 spins to rotate the blower fan, and the wind from the fan cools heat exchanging room 209.

Motor driver 203 in accordance with the first embodiment can be used in this second embodiment. Therefore, the alternating current (preferably a sine wave current) changing consecutively runs through the motor driving coils, so that torque ripple, vibrations and noises in driving the motor can be reduced, and further, an efficient motor-driving can be realized. As a result, the outdoor unit in accordance with this second exemplary embodiment of an air conditioner advantageously effects lower noise, fewer vibrations and higher efficiency.

As discussed above, when the motor driver of the present invention is employed in a fan motor, the apparatus using the fan motor can lower its noises and vibrations, and realize highly efficient operation. Here are several examples of apparatuses suitable for employing the fan motors having the motor driver of the present invention.

First, in the case of an air conditioner, the present invention can be applied not only to an outdoor unit but also to an indoor unit which blows cool or warm wind into a room. The indoor unit employing a fan motor having the motor driver of the present invention can effect extremely calm operation with fewer vibrations.

Next, the present invention can be also applied to an air cleaner. The air cleaner employing a fan motor having the motor driver of the present invention can effect extremely calm operation with fewer vibrations. The air cleaner advantageously effects these features particularly at a bedroom in the night.

The present invention can be further applied to a water heater such as a gas water-heater and an oil burning water-heater. The water heater employing a burning fan motor having the motor driver of the present invention can effect extremely calm and efficient operation with lower noise.

Exemplary Embodiment 3

Figure 16:
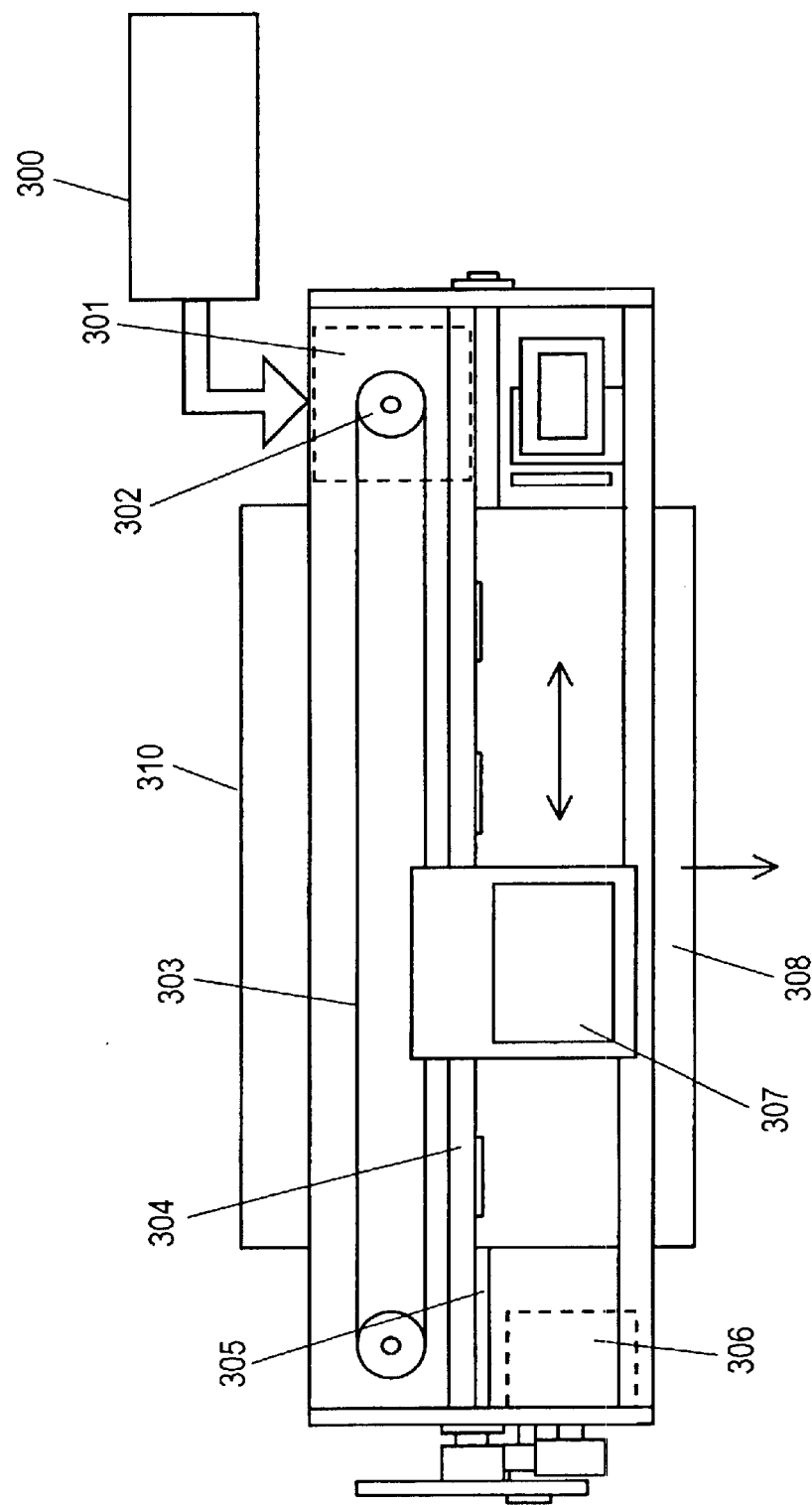
FIG. 16 shows a structure of an inkjet printer that employs the motor driver of the present invention in the driving system.
Figure 17:
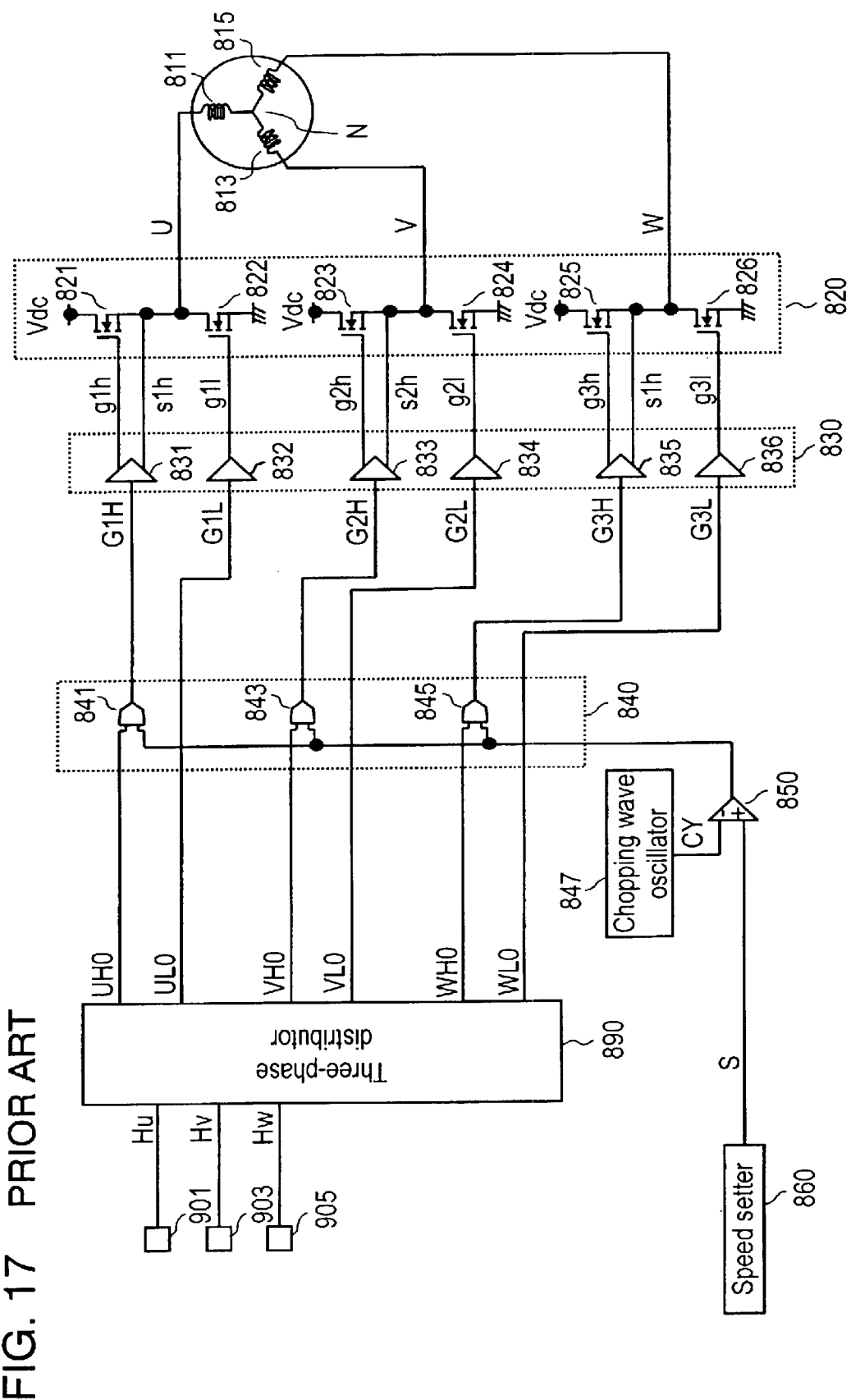
FIG. 17 shows a circuit diagram of a conventional motor driver.
Figure 18:
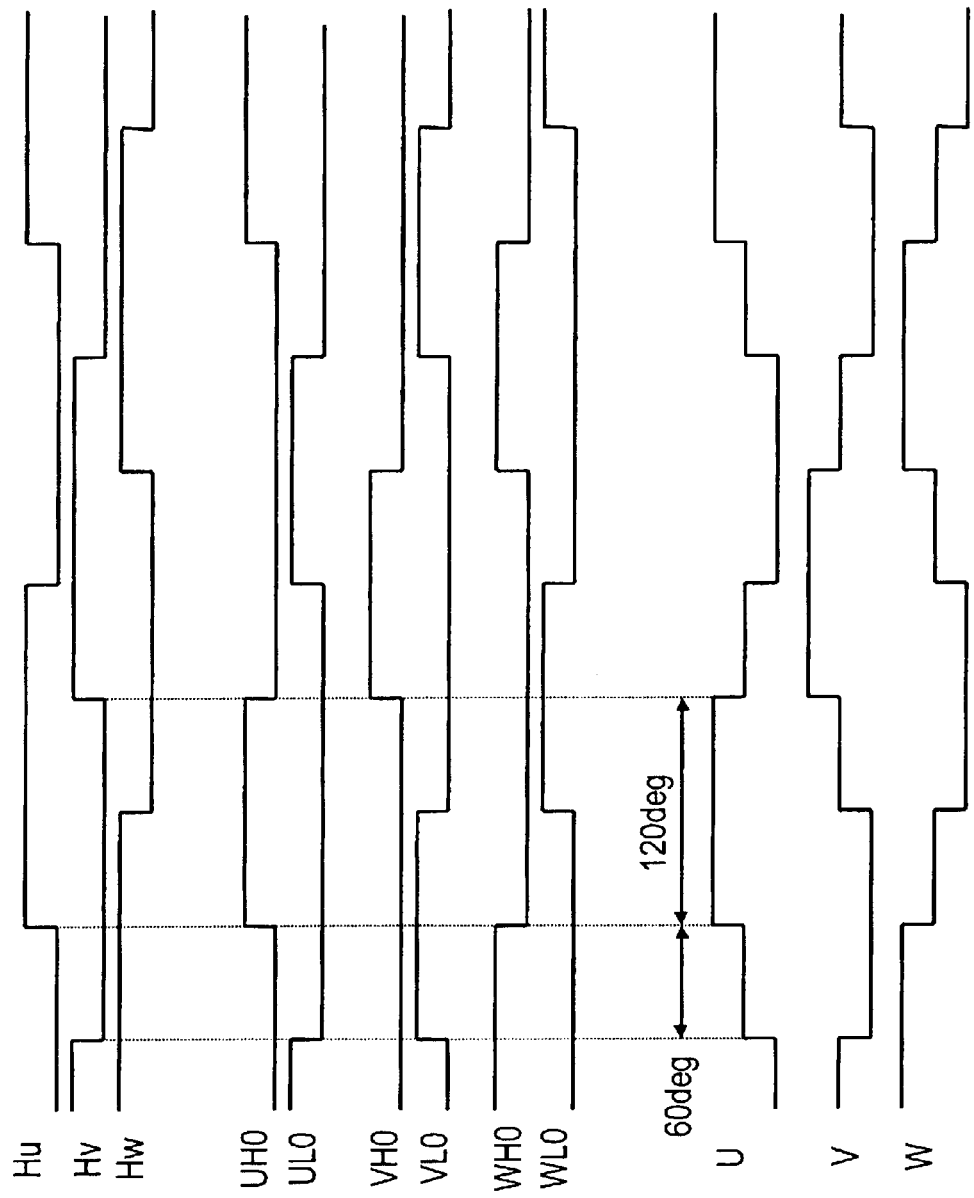
FIG. 18 shows waveforms of signals at respective sections of the motor driver shown in FIG. 17.

FIG. 16 shows a structure of an inkjet printer which employs the motor driver of the present invention in a driving system. In FIG. 16, inkjet printer (hereinafter referred to simply as a printer) 310 employs, in the driving system, carriage motor 301 for scanning print-head 307 mounted to a carriage and paper-feeding motor 306 for feeding recording paper. Carriage motor 301 is a brush-less DC motor and driven by motor driver 300. Paper feeding motor 306 is a stepping motor.

When paper feeding motor 306 spins, its torque is delivered to paper feeding roller 305, which feeds recording paper 308 this side in FIG. 16. On the other hand, pulley 302 is mounted to a rotary shaft of carriage motor 301, and timing belt 303 is entrained about pulley 302, and print head 307 is mounted to belt 303. Head 307 ejects liquid ink through nozzles (not shown) onto recording paper 308. Rotation of the carriage motor in forward and reverse directions allows, via the pulley and the belt, print head 307 to scan in both directions in FIG. 16. Scanning print-head 307, ejecting ink from head 307, and feeding paper 308 can form an image on paper 308.

The performance of carriage motor 301 crucially influences the printing performance such as high image quality and high-speed printing. In the case of color printing, in particular, inks of basic colors (yellow, magenta, cyan, and black) are mixed to produce various colors, thus the scanning performance of the print head is extremely important. As a result, the market requires superior performance of carriage motor 301.

The motor driver in accordance with the first embodiment can be applied to motor driver 300 in this embodiment. Therefore, the alternating current (preferably a sine wave current), which changes consecutively, runs through the motor driving coils, so that torque ripple, vibrations and noises in driving the motor can be reduced, and further, an efficient motor-driving can be realized. As a result, the printer in accordance with the third embodiment can be driven efficiently with lower noises, fewer vibrations, and also can advantageously produce a high quality image at a high printing speed.

In this third embodiment, an inkjet printer is taken as an example; however, a polygon-mirror scanner motor which is one of the motors in the driving system of a laser beam printer and is used to scan laser-beam, can employ the motor driver of the present invention. This employment allows the laser beam printer not only to operate efficiently with lower noises and fewer vibrations but also to produce advantageously a high quality image at a high printing speed.

Several other apparatuses are taken as examples suitable for employing the motor driver of the present invention. First, in a copying machine, a brush-less dc motor for driving a photosensitive drum can employ the motor driver, so that the copying machine can operate not only efficiently with lower noises, fewer vibrations, but also can produce advantageously a high quality image at a high copying speed. In a hard-disc apparatus or an optical media apparatus, a spindle motor for driving a disc can employ the motor driver, so that those apparatuses can operate efficiently with lower noises, fewer vibrations.

What is claimed is:

1. A motor driver comprising:
   (a) a driving coil of each one of three phases;
   (b) a dc power supply disposed between a first feeder line and a second feeder line;
   (c) a driving waveform generator for generating a driving waveform at intervals of one cycle in electrical angles corresponding to said driving coil;
   (d) a phase advancing controller for controlling a phase of the driving waveform; and
   (e) a power feeder for coupling said coils to one of the first feeder line and the second feeder line based on a pulse-width-modulated (PWM) signal modulated from the driving waveform, and for driving said coils with an alternating current (ac) consecutively changing,
   wherein said power feeder forms a first coupling status where a second-phase coil is coupled to the first feeder line and a first-phase and a third-phase coils are coupled to the second feeder line, and a second coupling status where the first-phase and the second-phase coils are coupled to the first feeder line and the third-phase coil is coupled to the second feeder line,
   wherein said phase advancing controller compares a common current in the first coupling status with the common current in the second coupling status, the common current running through one of the first feeder line and the second feeder line, and controls a phase of the driving waveform such that the common current values in the respective coupling statuses become approx. identical around a zero-cross of back electromotive force (BEMF) induced in the first-phase coil, and
   wherein the phase control by the phase advancing controller controls such that a phase of each one of the BEMFs of the respective phase-coils coincides with a phase of the ac running through the respective coils.

2. A motor driver comprising:
   (a) a driving coil of each one of three phases;
   (b) a dc power supply disposed between a first feeder line and a second feeder line;
   (c) a driving waveform generator for generating a driving waveform at intervals of one cycle in electrical angles corresponding to said driving coil;
   (d) a phase advancing controller for controlling a phase of the driving waveform; and
   (e) a power feeder for coupling said coils to one of the first feeder line and the second feeder line based on a pulse-width-modulated (PWM) signal modulated from the driving waveform, and for driving said coils with an alternating current (ac) consecutively changing,
   wherein said power feeder forms a third coupling status where a second-phase coil and a third-phase coil are coupled to the first feeder line and a first-phase coil is coupled to the second feeder line,
   wherein said phase advancing controller compares a zero value with a common current running through one of the first feeder line and the second feeder line in the third coupling status, and controls a phase of the driving waveform such that the common current value in the third coupling status becomes approx. zero around a zero-cross of back electromotive force (BEMF) induced in the first-phase coil, and
   wherein the phase control by the phase advancing controller controls such that a phase of each one of the BEMFs of the respective phase-coils coincides with a phase of the ac running through the respective coils.

3. The motor driver of claim 1, wherein the phase control by said phase advancing controller is done at intervals of "n" ("n": an integer equal to 1 or more than 1) cycle in electrical angles.

4. The motor driver of claim 2, wherein the phase control by said phase advancing controller is done at intervals of "n" ("n": an integer equal to 1 or more than 1) cycle in electrical angles.

5. The motor driver of claim 1, wherein the phase control by said phase advancing controller is done at intervals of "n" ("n": an integer equal to 1 or more than 1) cycle in mechanical angles.

6. The motor driver of claim 2, wherein the phase control by said phase advancing controller is done at intervals of "n" ("n": an integer equal to 1 or more than 1) cycle in mechanical angles.

7. The motor driver of claim 1, wherein the phase control by said phase advancing controller is done at intervals of "1/m" ("m": 2, 3, or 6) cycle in electrical angles.

8. The motor driver of claim 2, wherein the phase control by said phase advancing controller is done at intervals of "1/m" ("m": 2, 3, or 6) cycle in electrical angles.

9. The motor driver of claim 3, wherein the phase control over the driving waveform can be done when a result of comparing common current values at the timing of phase advancing control over the driving waveform by said phase advancing controller coincides with the past two or more consecutive results at the same timing.

10. The motor driver of claim 4, wherein the phase control over the driving waveform can be done when a result of comparing common current values at the timing of phase advancing control over the driving waveform by said phase advancing controller coincides with the past two or more consecutive results at the same timing.

11. The motor driver of claim 5, wherein the phase control over the driving waveform can be done when a result of comparing common current values at the timing of phase advancing control over the driving waveform by said phase advancing controller coincides with the past two or more consecutive results at the same timing.

12. The motor driver of claim 6, wherein the phase control over the driving waveform can be done when a result of comparing common current values at the timing of phase advancing control over the driving waveform by said phase advancing controller coincides with the past two or more consecutive results at the same timing.

13. The motor driver of claim 7, wherein the phase control over the driving waveform can be done when a result of comparing common current values at the timing of phase advancing control over the driving waveform by said phase advancing controller coincides with the past two or more consecutive results at the same timing.

14. The motor driver of claim 8, wherein the phase control over the driving waveform can be done when a result of comparing common current values at the timing of phase advancing control over the driving waveform by said phase advancing controller coincides with the past two or more consecutive results at the same timing.

15. The motor driver of claim 1, wherein the phase control over the driving waveform by said phase advancing controller is done when a mover is driven faster than a desired speed.

16. The motor driver of claim 2, wherein the phase control over the driving waveform by said phase advancing controller is done when a mover is driven faster than a desired speed.

17. The motor driver of claim 1, wherein the phase control over the driving waveform by said phase advancing controller is done when load torque of a motor is not less than a desired value.

18. The motor driver of claim 2, wherein the phase control over the driving waveform by said phase advancing controller is done when load torque of a motor is not less than a desired value.

19. An apparatus of which fan motor employs a motor driver, said motor driver comprising:
(a) a driving coil of each one of three phases;
(b) a dc power supply disposed between a first feeder line and a second feeder line;
(c) a driving waveform generator for generating a driving waveform at intervals of one cycle in electrical angles corresponding to said driving coil;
(d) a phase advancing controller for controlling a phase of the driving waveform; and
(e) a power feeder for coupling said coils to one of the first feeder line and the second feeder line based on a pulse-width-modulated (PWM) signal modulated from the driving waveform, and for driving said coils with an alternating current (ac) consecutively changing,
wherein said power feeder forms a first coupling status where a second-phase coil is coupled to the first feeder line and a first-phase and a third-phase coils are coupled to the second feeder line, and a second coupling status where the first-phase and the second-phase coils are coupled to the first feeder line and the third-phase coil is coupled to the second feeder line,
wherein said phase advancing controller compares a common current in the first coupling status with the common current in the second coupling status, the common current running through one of the first feeder line and the second feeder line, and controls a phase of the driving waveform such that the common current values in the respective coupling statuses become approx. identical around a zero-cross of back electromotive force (BEMF) induced in the first-phase coil, and
wherein the phase control by the phase advancing controller controls such that a phase of each one of the BEMFs of the respective phase-coils coincides with a phase of the ac running through the respective coils.

20. An apparatus of which fan motor employs a motor driver, said motor driver comprising:
(a) a driving coil of each one of three phases;
(b) a dc power supply disposed between a first feeder line and a second feeder line;
(c) a driving waveform generator for generating a driving waveform at intervals of one cycle in electrical angles corresponding to said driving coil;
(d) a phase advancing controller for controlling a phase of the driving waveform; and
(e) a power feeder for coupling said coils to one of the first feeder line and the second feeder line based on a pulse-width-modulated (PWM) signal modulated from the driving waveform, and for driving said coils with an alternating current (ac) consecutively changing,
wherein said power feeder forms a third coupling status where a second-phase coil and a third-phase coil are coupled to the first feeder line and a first-phase coil is coupled to the second feeder line,
wherein said phase advancing controller compares a zero value with a common current running through one of the first feeder line and the second feeder line in the third coupling status, and controls a phase of the driving waveform such that the common current value in the third coupling status becomes approx. zero around a zero-cross of back electromotive force (BEMF) induced in the first-phase coil, and wherein the phase control by the phase advancing controller controls such that a phase of each one of the BEMFs of the respective phase-coils coincides with a phase of the ac running through the respective coils.

21. The apparatus of claim 19, wherein the apparatus is an air-conditioner.

22. The apparatus of claim 20, wherein the apparatus is an air-conditioner.

23. The apparatus of claim 19, wherein the apparatus is an air cleaner.

24. The apparatus of claim 20, wherein the apparatus is an air cleaner.

25. The apparatus of claim 19, wherein the apparatus is a water heater.

26. The apparatus of claim 20, wherein the apparatus is a water heater.

27. An apparatus of which driving system employs a motor driver, said motor driver comprising:

(a) a driving coil of each one of three phases;

(b) a dc power supply disposed between a first feeder line and a second feeder line;

(c) a driving waveform generator for generating a driving waveform at intervals of one cycle in electrical angles corresponding to said driving coil;

(d) a phase advancing controller for controlling a phase of the driving waveform; and (e) a power feeder for coupling said coils to one of the first feeder line and the second feeder line based on a pulse-width-modulated (PWM) signal modulated from the driving waveform, and for driving said coils with an alternating current (ac) consecutively changing, wherein said power feeder forms a first coupling status where a second-phase coil is coupled to the first feeder line and a first-phase and a third-phase coils are coupled to the second feeder line, and a second coupling status where the first-phase and the second-phase coils are coupled to the first feeder line and the third-phase coil is coupled to the second feeder line, wherein said phase advancing controller compares a common current in the first coupling status with the common current in the second coupling status, the common current running through one of the first feeder line and the second feeder line, and controls a phase of the driving waveform such that the common current values in the respective coupling statuses become approx. identical around a zero-cross of back electromotive force (BEMF) induced in the first-phase coil, and wherein the phase control by the phase advancing controller controls such that a phase of each one of the BEMFs of the respective phase-coils coincides with a phase of the ac running through the respective coils.

28. An apparatus of which driving system employs a motor driver, said motor driver comprising:

(a) a driving coil of each one of three phases;

(b) a dc power supply disposed between a first feeder line and a second feeder line;

(c) a driving waveform generator for generating a driving waveform at intervals of one cycle in electrical angles corresponding to said driving coil;

(d) a phase advancing controller for controlling a phase of the driving waveform; and (e) a power feeder for coupling said coils to one of the first feeder line and the second feeder line based on a pulse-width-modulated (PWM) signal modulated from the driving waveform, and for driving said coils with an alternating current (ac) consecutively changing, wherein said power feeder forms a third coupling status where a second-phase coil and a third-phase coil are coupled to the first feeder line and a first-phase coil is coupled to the second feeder line, wherein said phase advancing controller compares a zero value with a common current running through one of the first feeder line and the second feeder line in the third coupling status, and controls a phase of the driving waveform such that the common current value in the third coupling status becomes approx. zero around a zero-cross of back electromotive force (BEMF) induced in the first-phase coil, and wherein the phase control by the phase advancing controller controls such that a phase of each one of the BEMFs of the respective phase-coils coincides with a phase of the ac running through the respective coils.

29. The apparatus of claim 27, wherein the apparatus is a printer.

30. The apparatus of claim 28, wherein the apparatus is a printer.

31. The apparatus of claim 27, wherein the apparatus is a copying machine.

32. The apparatus of claim 28, wherein the apparatus is a copying machine.

33. The apparatus of claim 27, wherein the apparatus is a hard disc apparatus.

34. The apparatus of claim 28, wherein the apparatus is a hard disc apparatus.

35. The apparatus of claim 27, wherein the apparatus is an optical media apparatus.

36. The apparatus of claim 28, wherein the apparatus is an optical media apparatus.

* * * * *